United States Patent
Knoblach et al.

(10) Patent No.: US 10,696,400 B2
(45) Date of Patent: *Jun. 30, 2020

(54) BREAKING APART A PLATFORM UPON PENDING COLLISION

(71) Applicant: SPACE DATA CORPORATION, Chandler, AZ (US)

(72) Inventors: Gerald M. Knoblach, Chandler, AZ (US); Eric A. Frische, Addison, TX (US)

(73) Assignee: SPACE DATA CORPORATION, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,761

(22) Filed: Jan. 2, 2019

(65) Prior Publication Data

US 2019/0135436 A1  May 9, 2019

Related U.S. Application Data

(63) Continuation of application No. 14/757,425, filed on Dec. 23, 2015, now Pat. No. 10,207,802.

(Continued)

(51) Int. Cl.
*G08G 5/04* (2006.01)
*B64D 1/02* (2006.01)
(Continued)

(52) U.S. Cl.
CPC .................. *B64D 1/02* (2013.01); *B64B 1/40* (2013.01); *B64B 1/42* (2013.01); *B64B 1/50* (2013.01); *B64B 1/70* (2013.01); *G08G 5/045* (2013.01)

(58) Field of Classification Search
CPC ........ G08G 5/04; G08G 5/003; G08G 5/0034; G08G 5/0039; G08G 5/0013;
(Continued)

(56) References Cited

U.S. PATENT DOCUMENTS 2,151,336 A   3/1939 Scharlau
2,366,423 A   1/1945 Pear, Jr.
(Continued)

FOREIGN PATENT DOCUMENTS

DE   1188951   3/1965
EP   0490722   6/1992
(Continued)

OTHER PUBLICATIONS

Office Action from U.S. Patent and Trademark Office for U.S. Appl. No. 12/168,451, dated May 10, 2011.
(Continued)

*Primary Examiner* — Richard A Goldman
(74) *Attorney, Agent, or Firm* — Dave Law Group LLC; Raj S. Dave

(57) ABSTRACT

A method and system for separating and releasing component parts of a payload of a floating platform in response to a high collision probability is disclosed. The method includes, determining if an in-flight aircraft is within at least a safety zone associated with a floating platform, wherein the floating platform comprises releasably-coupled component parts; and activating, responsive to a determination that the in-flight aircraft is within at least the safety zone, a release mechanism, wherein the release mechanism is configured to uncouple the component parts.

20 Claims, 13 Drawing Sheets

Related U.S. Application Data

(60) Provisional application No. 62/096,751, filed on Dec. 24, 2014.

(51) Int. Cl.
    *B64B 1/40* (2006.01)
    *B64B 1/42* (2006.01)
    *B64B 1/50* (2006.01)
    *B64B 1/70* (2006.01)

(58) Field of Classification Search
    CPC .. G08G 5/0021; G08G 5/0026; G08G 5/0069; G08G 5/0045; G08G 5/0073; G08G 5/0078; G08G 5/0082; G08G 5/0004; G08G 5/0008; G08G 5/045; G08G 5/0091; B64B 1/40; G01C 21/00; G05D 1/105
    USPC ..... 701/2, 3, 4, 300, 301, 302, 26; 340/961; 342/29, 30
    See application file for complete search history.

(56) References Cited

U.S. PATENT DOCUMENTS

| | | |
|---|---|---|
| 2,462,102 A | 2/1949 | Istvan |
| 2,542,823 A | 2/1951 | Lyle |
| 2,598,064 A | 5/1952 | Linedenblad |
| 2,625,348 A | 1/1953 | Noxon et al. |
| 2,742,246 A | 4/1956 | Mellen |
| 3,030,500 A | 4/1962 | Katzin |
| 3,030,509 A | 4/1962 | Carlson |
| 3,045,952 A | 7/1962 | Underwood |
| 3,058,694 A | 10/1962 | Fazio et al. |
| 3,174,705 A | 3/1965 | Schiff et al. |
| 3,206,749 A | 9/1965 | Chatelain |
| 3,384,891 A | 5/1968 | Anderson |
| 3,404,278 A | 10/1968 | Chope |
| 3,471,856 A | 10/1969 | Laugh, Jr. et al. |
| 3,555,552 A | 1/1971 | Alford |
| 3,674,225 A | 7/1972 | Johnson |
| 3,742,358 A | 6/1973 | Cesaro |
| 3,781,893 A | 12/1973 | Beukers et al. |
| 3,781,894 A | 12/1973 | Ancona et al. |
| 4,123,987 A | 11/1978 | Singerle et al. |
| 4,249,161 A | 2/1981 | Lee |
| 4,262,864 A | 4/1981 | Eshoo |
| 4,394,780 A | 7/1983 | Mooradian |
| 4,419,766 A | 12/1983 | Goeken et al. |
| 4,457,477 A | 7/1984 | Regipa |
| 4,472,720 A | 9/1984 | Reesor |
| 4,481,514 A | 11/1984 | Beukers et al. |
| 4,509,053 A | 4/1985 | Robin et al. |
| 4,509,851 A | 4/1985 | Ippolito et al. |
| 4,589,093 A | 5/1986 | Ippolito et al. |
| 4,595,928 A | 6/1986 | Wingard |
| 4,689,739 A | 8/1987 | Federico et al. |
| 4,696,052 A | 9/1987 | Breeden |
| 4,740,783 A | 4/1988 | Lawrence et al. |
| 4,747,160 A | 5/1988 | Bossard |
| 4,868,577 A | 9/1989 | Wingard |
| 4,979,170 A | 12/1990 | Gilhousen et al. |
| 4,995,572 A | 2/1991 | Piasecki |
| 5,005,513 A | 4/1991 | Van Patten et al. |
| 5,067,172 A | 11/1991 | Schloemer |
| 5,119,397 A | 6/1992 | Dahlin et al. |
| 5,121,128 A | 6/1992 | Lidth de Jeude et al. |
| 5,123,112 A | 6/1992 | Choate |
| 5,175,556 A | 12/1992 | Berkowitz |
| 5,189,734 A | 2/1993 | Bailey et al. |
| 5,204,970 A | 4/1993 | Stengel et al. |
| 5,212,804 A | 5/1993 | Choate |
| 5,214,789 A | 5/1993 | George |
| 5,218,366 A | 6/1993 | Cardamone et al. |
| 5,235,633 A | 8/1993 | Dennison et al. |
| 5,239,668 A | 8/1993 | Davis |
| 5,287,541 A | 2/1994 | Davis |
| 5,327,572 A | 7/1994 | Freeberg |
| 5,345,448 A | 9/1994 | Keskitalo |
| 5,359,574 A | 10/1994 | Nadolink |
| 5,384,565 A | 1/1995 | Cannon |
| 5,420,592 A | 5/1995 | Johnson |
| 5,430,656 A | 7/1995 | Dekel et al. |
| 5,433,726 A | 7/1995 | Horsten et al. |
| 5,439,190 A | 8/1995 | Horstein et al. |
| 5,444,762 A | 8/1995 | Frey et al. |
| 5,455,823 A | 10/1995 | Noreen et al. |
| 5,467,681 A | 11/1995 | Librman |
| 5,471,641 A | 11/1995 | Dosiere et al. |
| 5,488,648 A | 1/1996 | Womble |
| 5,519,761 A | 5/1996 | Gilhousen |
| 5,521,817 A | 5/1996 | Burdoin et al. |
| 5,533,029 A | 7/1996 | Gardner |
| 5,557,656 A | 9/1996 | Ray et al. |
| 5,559,865 A | 9/1996 | Gilhousen |
| 5,584,047 A | 12/1996 | Tuck |
| 5,615,409 A | 3/1997 | Forssen et al. |
| 5,645,248 A | 7/1997 | Campbell |
| 5,714,948 A | 2/1998 | Farmakis et al. |
| 5,745,685 A | 4/1998 | Kirchner et al. |
| 5,748,620 A | 5/1998 | Capurka |
| 5,759,712 A | 6/1998 | Hockaday |
| 5,761,655 A | 6/1998 | Ben-Shachar |
| 5,781,739 A | 7/1998 | Bach et al. |
| 5,788,187 A | 8/1998 | Castiel et al. |
| 5,832,380 A | 11/1998 | Ray et al. |
| 5,835,059 A | 11/1998 | Nadel et al. |
| 5,870,549 A | 2/1999 | Bobo |
| 5,899,975 A | 5/1999 | Nielsen |
| 5,907,949 A | 6/1999 | Falke et al. |
| 5,909,299 A | 6/1999 | Sheldon, Jr. et al. |
| 5,960,200 A | 9/1999 | Eager et al. |
| 5,963,128 A | 10/1999 | McClelland |
| 5,978,940 A | 11/1999 | Newman et al. |
| 5,987,432 A | 11/1999 | Zusman et al. |
| 5,992,795 A | 11/1999 | Tockert |
| 5,996,001 A | 11/1999 | Quarles et al. |
| 6,061,562 A | 5/2000 | Martin et al. |
| 6,067,579 A | 5/2000 | Hardman et al. |
| 6,097,688 A | 8/2000 | Ichimura et al. |
| 6,108,673 A | 8/2000 | Brandt et al. |
| 6,128,622 A | 10/2000 | Bach et al. |
| 6,141,660 A | 10/2000 | Bach et al. |
| 6,144,899 A * | 11/2000 | Babb ............... B64C 13/18 102/384 |
| 6,167,263 A | 12/2000 | Campbell |
| 6,212,550 B1 | 4/2001 | Segur |
| 6,243,737 B1 | 6/2001 | Flanagan et al. |
| 6,250,309 B1 | 6/2001 | Krichen et al. |
| 6,253,200 B1 | 6/2001 | Smedley et al. |
| 6,256,676 B1 | 7/2001 | Taylor et al. |
| 6,259,447 B1 | 7/2001 | Kanetake et al. |
| 6,289,382 B1 | 9/2001 | Bowman-Amuah |
| 6,324,398 B1 | 11/2001 | Lanzerotti et al. |
| 6,397,253 B1 | 5/2002 | Quinlan et al. |
| 6,401,136 B1 | 6/2002 | Britton et al. |
| 6,414,947 B1 | 7/2002 | Legg et al. |
| 6,446,110 B1 | 9/2002 | Lection et al. |
| 6,507,856 B1 | 1/2003 | Chen et al. |
| 6,507,857 B1 | 1/2003 | Y.Alcinalp |
| 6,510,466 B1 | 1/2003 | Cox et al. |
| 6,519,617 B1 | 2/2003 | Wanderski et al. |
| 6,529,921 B1 | 3/2003 | Berkowitz et al. |
| 6,530,078 B1 | 3/2003 | Shmid et al. |
| 6,535,896 B2 | 3/2003 | Britton et al. |
| 6,543,343 B2 | 4/2003 | Taylor |
| 6,560,639 B1 | 5/2003 | Dan et al. |
| 6,568,631 B1 | 5/2003 | Hillsdon |
| 6,589,291 B1 | 7/2003 | Boag et al. |
| 6,591,272 B1 | 7/2003 | Williams |
| 6,601,071 B1 | 7/2003 | Bowker et al. |
| 6,606,642 B2 | 8/2003 | Ambler et al. |
| 6,613,098 B1 | 9/2003 | Sorge et al. |
| 6,615,363 B1 | 9/2003 | Talluri et al. |

(56) References Cited

U.S. PATENT DOCUMENTS

| | | |
|---|---|---|
| 6,628,941 B2 | 9/2003 | Knoblach |
| 6,643,825 B1 | 11/2003 | Li et al. |
| 6,665,861 B1 | 12/2003 | Francis et al. |
| 6,666,410 B2 * | 12/2003 | Boelitz ............... B64G 1/002 244/171.1 |
| 6,668,354 B1 | 12/2003 | Chen et al. |
| 6,675,095 B1 * | 1/2004 | Bird .................... G05D 1/0061 340/436 |
| 6,687,873 B1 | 2/2004 | Ballantyne et al. |
| 6,697,489 B1 | 2/2004 | Carlson |
| 6,728,685 B1 | 4/2004 | Ahluwalia |
| 6,738,975 B1 | 5/2004 | Yee et al. |
| 6,753,889 B1 | 6/2004 | Naimi |
| 6,772,206 B1 | 8/2004 | Lowry et al. |
| 6,775,680 B2 | 8/2004 | Ehrman et al. |
| 6,799,299 B1 | 9/2004 | Li et al. |
| 6,810,429 B1 | 10/2004 | Walsh et al. |
| 6,816,883 B2 | 11/2004 | Baumeister et al. |
| 6,826,696 B1 | 11/2004 | Chawla et al. |
| 6,843,448 B2 | 1/2005 | Parmley |
| 6,850,979 B1 | 2/2005 | Saulpaugh et al. |
| 6,859,834 B1 | 2/2005 | Arora et al. |
| 6,874,146 B1 | 3/2005 | Lyengar |
| 6,889,360 B1 | 5/2005 | Ho et al. |
| 6,901,403 B1 | 5/2005 | Bata et al. |
| 6,901,430 B1 | 5/2005 | Smith |
| 6,904,598 B2 | 6/2005 | Abileah et al. |
| 6,907,564 B1 | 6/2005 | Burchhardt et al. |
| 6,909,903 B2 | 6/2005 | Wang |
| 6,910,216 B2 | 6/2005 | Abileah et al. |
| 6,912,719 B2 | 6/2005 | Elderon et al. |
| 6,915,523 B2 | 7/2005 | Dong et al. |
| 6,948,117 B2 | 9/2005 | Van Eaton et al. |
| 6,948,174 B2 | 9/2005 | Chiang et al. |
| 6,952,717 B1 | 10/2005 | Monchilovich et al. |
| 6,964,053 B2 | 11/2005 | Ho et al. |
| 6,971,096 B1 | 11/2005 | Ankireddipally et al. |
| 6,980,963 B1 | 12/2005 | Hanzek |
| 6,980,993 B2 | 12/2005 | Horvitz et al. |
| 7,000,238 B2 | 2/2006 | Naler et al. |
| 7,013,306 B1 | 3/2006 | Turba et al. |
| 7,043,687 B2 | 5/2006 | Knauss et al. |
| 7,051,032 B2 | 5/2006 | Chu-Carroll et al. |
| 7,054,901 B2 | 5/2006 | Shafer |
| 7,058,955 B2 | 6/2006 | Porkka |
| 7,069,291 B2 | 6/2006 | Graves et al. |
| 7,080,092 B2 | 7/2006 | Upton |
| 7,093,789 B2 | 8/2006 | Barocela et al. |
| 7,107,285 B2 | 9/2006 | Von Kaenel et al. |
| 7,111,011 B2 | 9/2006 | Kobayashi et al. |
| 7,120,645 B2 | 10/2006 | Manikutty et al. |
| 7,120,702 B2 | 10/2006 | Huang et al. |
| 7,124,299 B2 | 10/2006 | Dick et al. |
| 7,130,893 B2 | 10/2006 | Chiang et al. |
| 7,134,075 B2 | 11/2006 | Hind et al. |
| 7,143,190 B2 | 11/2006 | Christensen et al. |
| 7,152,205 B2 | 12/2006 | Day et al. |
| 7,181,493 B2 | 2/2007 | English et al. |
| 7,266,582 B2 | 9/2007 | Stelting et al. |
| 7,296,229 B2 | 11/2007 | Berstis |
| 7,341,223 B2 | 3/2008 | Chu |
| 7,398,221 B1 | 7/2008 | Bensoussan et al. |
| 7,418,508 B2 | 8/2008 | Haller et al. |
| 7,421,701 B2 | 9/2008 | Dinh et al. |
| 7,487,936 B2 | 2/2009 | Heaven |
| 7,567,779 B2 | 7/2009 | Seligsohn et al. |
| 7,590,967 B1 | 9/2009 | Behrendt et al. |
| 7,801,522 B2 | 9/2010 | Knoblach et al. |
| 8,286,910 B2 | 10/2012 | Alavi |
| 8,342,442 B1 | 1/2013 | Dancila |
| 8,718,477 B2 | 5/2014 | Devaul et al. |
| 8,733,697 B2 | 5/2014 | Devaul et al. |
| 8,812,176 B1 | 8/2014 | Biffle et al. |
| 8,820,678 B2 | 9/2014 | Devaul et al. |
| 8,996,024 B1 | 3/2015 | Teller et al. |
| 9,300,388 B1 | 3/2016 | Behroozi et al. |
| 9,407,362 B2 | 8/2016 | DeVaul et al. |
| 9,424,752 B1 | 8/2016 | Bonawitz |
| 9,590,721 B2 | 3/2017 | Behroozi et al. |
| 9,714,831 B2 | 7/2017 | Kapoor et al. |
| 2001/0004583 A1 | 6/2001 | Uchida |
| 2001/0014900 A1 | 8/2001 | Brauer et al. |
| 2001/0016869 A1 | 8/2001 | Baumeister et al. |
| 2001/0032232 A1 | 10/2001 | Zombek et al. |
| 2001/0034791 A1 | 10/2001 | Clubb et al. |
| 2001/0037358 A1 | 11/2001 | Clubb et al. |
| 2001/0047311 A1 | 11/2001 | Singh |
| 2002/0010716 A1 | 1/2002 | McCartney et al. |
| 2002/0031101 A1 | 3/2002 | Petite et al. |
| 2002/0035583 A1 | 3/2002 | Price et al. |
| 2002/0038335 A1 | 3/2002 | Dong et al. |
| 2002/0038336 A1 | 3/2002 | Abileah et al. |
| 2002/0042849 A1 | 4/2002 | Ho et al. |
| 2002/0046294 A1 | 4/2002 | Brodsky et al. |
| 2002/0049815 A1 | 4/2002 | Dattatri |
| 2002/0052968 A1 | 5/2002 | Bonefas et al. |
| 2002/0056012 A1 | 5/2002 | Abileah et al. |
| 2002/0059344 A1 | 5/2002 | Britton et al. |
| 2002/0072361 A1 | 6/2002 | Knoblach |
| 2002/0078010 A1 | 6/2002 | Ehrman et al. |
| 2002/0078255 A1 | 6/2002 | Narayan |
| 2002/0083099 A1 | 6/2002 | Knauss et al. |
| 2002/0099735 A1 | 7/2002 | Schroeder et al. |
| 2002/0100027 A1 | 7/2002 | Binding et al. |
| 2002/0107915 A1 | 8/2002 | Ally et al. |
| 2002/0111989 A1 | 8/2002 | Amber et al. |
| 2002/0116454 A1 | 8/2002 | Dyla et al. |
| 2002/0133569 A1 | 9/2002 | Huang et al. |
| 2002/0143820 A1 | 10/2002 | Van Eaton et al. |
| 2002/0156930 A1 | 10/2002 | Velasquez |
| 2002/0160745 A1 | 10/2002 | Wang |
| 2002/0160805 A1 | 10/2002 | Laitinen et al. |
| 2002/0161801 A1 | 10/2002 | Hind et al. |
| 2002/0174340 A1 | 11/2002 | Dick et al. |
| 2002/0175243 A1 | 11/2002 | Black et al. |
| 2002/0178031 A1 | 11/2002 | Sorensen et al. |
| 2002/0178290 A1 | 11/2002 | Coulthard et al. |
| 2002/0178299 A1 | 11/2002 | Teubner |
| 2002/0188688 A1 | 12/2002 | Bice et al. |
| 2002/0194227 A1 | 12/2002 | Day et al. |
| 2002/0198974 A1 | 12/2002 | Shafer |
| 2003/0004746 A1 | 1/2003 | Kheirolomoom et al. |
| 2003/0007397 A1 | 1/2003 | Kobayashi et al. |
| 2003/0040273 A1 | 2/2003 | Seligsohn et al. |
| 2003/0040955 A1 | 2/2003 | Anaya et al. |
| 2003/0120730 A1 | 2/2003 | Kuno et al. |
| 2003/0046035 A1 | 3/2003 | Anaya et al. |
| 2003/0055768 A1 | 3/2003 | Anaya et al. |
| 2003/0065623 A1 | 4/2003 | Cornell et al. |
| 2003/0070006 A1 | 4/2003 | Nadler et al. |
| 2003/0074217 A1 | 4/2003 | Beisiegei et al. |
| 2003/0078902 A1 | 4/2003 | Leong et al. |
| 2003/0081002 A1 | 5/2003 | De Vorchik et al. |
| 2003/0093403 A1 | 5/2003 | Upton |
| 2003/0093436 A1 | 5/2003 | Brown et al. |
| 2003/0093468 A1 | 5/2003 | Gordon et al. |
| 2003/0093500 A1 | 5/2003 | Khodabakchian et al. |
| 2003/0097327 A1 | 5/2003 | Anaya et al. |
| 2003/0109281 A1 * | 6/2003 | Knoblach ............... B64B 1/40 455/556.1 |
| 2003/0121142 A1 | 7/2003 | Horvitz et al. |
| 2003/0126229 A1 | 7/2003 | Kantor et al. |
| 2003/0159111 A1 | 8/2003 | Fry |
| 2003/0163544 A1 | 8/2003 | Wookey et al. |
| 2003/0163585 A1 | 8/2003 | Elderon et al. |
| 2003/0167233 A1 | 9/2003 | Pledereder et al. |
| 2003/0191970 A1 | 10/2003 | Devine et al. |
| 2003/0204460 A1 | 10/2003 | Robinson et al. |
| 2003/0212686 A1 | 11/2003 | Chu-Carroll et al. |
| 2004/0006739 A1 | 1/2004 | Mulligan |
| 2004/0024820 A1 | 2/2004 | Ozzie et al. |
| 2004/0030740 A1 | 2/2004 | Stelting |
| 2004/0064466 A1 | 4/2004 | Manikutty et al. |
| 2004/0103370 A1 | 5/2004 | Chiang et al. |

(56) References Cited

U.S. PATENT DOCUMENTS

| | | |
|---|---|---|
| 2004/0104304 A1 | 6/2004 | Parmley |
| 2004/0111464 A1 | 6/2004 | Ho et al. |
| 2004/0205536 A1 | 10/2004 | Newman et al. |
| 2004/0205731 A1 | 10/2004 | Junkermann |
| 2004/0205770 A1 | 10/2004 | Zhang et al. |
| 2004/0210469 A1 | 10/2004 | Jones et al. |
| 2004/0221292 A1 | 11/2004 | Chiang et al. |
| 2004/0230987 A1 | 11/2004 | Snover et al. |
| 2004/0237034 A1 | 11/2004 | Chiang et al. |
| 2005/0014499 A1* | 1/2005 | Knoblach ............ B64B 1/40 455/431 |
| 2005/0050228 A1 | 3/2005 | Perham et al. |
| 2005/0091639 A1 | 4/2005 | Patel |
| 2005/0165826 A1 | 7/2005 | Ho et al. |
| 2005/0165936 A1 | 7/2005 | Haller et al. |
| 2005/0166209 A1 | 7/2005 | Merrick et al. |
| 2005/0171970 A1 | 8/2005 | Ozzie et al. |
| 2005/0203944 A1 | 9/2005 | Dinh et al. |
| 2005/0210414 A1 | 9/2005 | Angiulo et al. |
| 2005/0258306 A1 | 11/2005 | Barocela et al. |
| 2005/0278410 A1 | 12/2005 | Espino |
| 2006/0063529 A1 | 3/2006 | Seligsohn et al. |
| 2006/0265478 A1 | 11/2006 | Chiang et al. |
| 2007/0083524 A1 | 4/2007 | Fung et al. |
| 2007/0084283 A1 | 4/2007 | Fung et al. |
| 2008/0263641 A1 | 10/2008 | Dinh et al. |
| 2008/0271049 A1 | 10/2008 | Dinh et al. |
| 2006/0299990 | 12/2008 | Knoblach et al. |
| 2009/0189015 A1 | 7/2009 | Alavi |
| 2009/0294582 A1 | 12/2009 | Michel et al. |
| 2010/0100269 A1* | 4/2010 | Ekhaguere ............ G05D 1/101 701/26 |
| 2010/0131121 A1* | 5/2010 | Gerlock ............ G08G 5/0013 701/2 |
| 2010/0228468 A1* | 9/2010 | D'Angelo ............ G08G 5/0008 701/120 |
| 2010/0292871 A1 | 11/2010 | Schultz et al. |
| 2011/0118907 A1* | 5/2011 | Elkins .................. B64B 1/00 701/3 |
| 2012/0158280 A1* | 6/2012 | Ravenscroft ......... G01C 21/005 701/400 |
| 2012/0223181 A1* | 9/2012 | Ciampa ................ B64B 1/62 244/30 |
| 2013/0158749 A1* | 6/2013 | Contorer .............. G01P 5/18 701/3 |
| 2013/0175387 A1 | 7/2013 | Devaul et al. |
| 2013/0175391 A1 | 7/2013 | DeVaul et al. |
| 2013/0177321 A1 | 7/2013 | DeVaul et al. |
| 2014/0158823 A1* | 6/2014 | Smith .................. B64B 1/44 244/1 A |
| 2014/0166817 A1* | 6/2014 | Levien ................ B64C 39/024 244/190 |
| 2014/0249693 A1 | 9/2014 | Stark et al. |
| 2014/0284422 A1 | 9/2014 | Sapir |
| 2014/0367511 A1 | 12/2014 | Knoblach et al. |
| 2014/0379173 A1* | 12/2014 | Knapp .................. G06Q 10/10 701/2 |
| 2015/0134150 A1* | 5/2015 | Farjon ................ G05D 1/0202 701/3 |
| 2015/0160658 A1* | 6/2015 | Reedman ............ G05D 1/102 701/3 |
| 2015/0248711 A1 | 9/2015 | Fournier et al. |
| 2016/0003620 A1* | 1/2016 | Kapoor ................ G01C 21/00 701/400 |
| 2016/0155338 A1* | 6/2016 | Lynar ................ G08G 5/0008 701/4 |
| 2016/0167761 A1 | 6/2016 | Roach |
| 2016/0189548 A1* | 6/2016 | Thurling ............ G08G 5/0013 701/3 |
| 2016/0196750 A1* | 7/2016 | Collins ................ B64C 39/024 701/14 |
| 2016/0196757 A1* | 7/2016 | Knoblach ............ G05D 1/105 701/301 |
| 2016/0214716 A1* | 7/2016 | Knoblach ............ B64B 1/42 |
| 2016/0226573 A1 | 8/2016 | Behroozi |
| 2016/0253908 A1* | 9/2016 | Chambers ............ B64C 39/024 701/2 |

FOREIGN PATENT DOCUMENTS

| | | |
|---|---|---|
| EP | 0837567 A2 | 4/1998 |
| EP | 1058409 | 12/2000 |
| EP | 1327580 A2 | 7/2003 |
| EP | 2719719 | 4/2014 |
| GB | 2216319 | 10/1989 |
| GB | 2511447 | 9/2014 |
| JP | H0443194 | 2/1992 |
| JP | 950826 | 2/1997 |
| JP | 2001273177 | 10/2001 |
| WO | WO9504407 | 2/1995 |
| WO | WO9602094 | 1/1996 |
| WO | WO9851568 A1 | 11/1998 |
| WO | WO0101710 | 1/2001 |
| WO | WO 01/58098 A2 | 8/2001 |
| WO | WO0167290 | 9/2001 |
| WO | 2006/108311 | 10/2006 |
| WO | 2011/148373 | 12/2011 |

OTHER PUBLICATIONS

Office Action from U.S. Patent and Trademark Office for U.S. Appl. No. 12/169,486, dated Feb. 1, 2012.

James L. Rand, "Long Duration Balloons", Balloon Technology and Observations, Advance Space Research, vol. 14, No. 2, pp. (2)183-(2)190, Feb. 1994.

Australian Search Report dated Oct. 30, 2018, for Australian patent application No. 2004278389, 5 pages.

Final Office Action dated Aug. 1, 2017 in related U.S. Appl. No. 15/343,190.

Notice of Allowance dated May 10, 2017 in corresponding U.S. Appl. No. 15/351,441(8 pages).

Non-Final Office Action dated Aug. 15, 2017 in related U.S. Appl. No. 14/983,119.

Non-Final Office Action dated Feb. 14, 2017 in corresponding U.S. Appl. No. 15/351,441.

Notice of Allowance dated Apr. 13, 2017 in corresponding U.S. Appl. No. 15/434,036.

Notice of Allowance dated Feb. 17, 2017 in corresponding U.S. Appl. No. 15/351,438.

Notice of Allowance dated Jun. 19, 2017 in corresponding U.S. Appl. No. 14/757,426.

* cited by examiner

BREAKING APART A PLATFORM UPON PENDING COLLISION

CROSS-REFERENCE TO RELATED APPLICATIONS

This application is continuation of U.S. patent application Ser. No. 14/757,425, filed Dec. 23, 2015, which claims benefit of priority under 35 U.S.C. § 119(e) from U.S. Provisional Patent Application No. 62/096,751, filed Dec. 24, 2014, which are incorporated herein by reference in their entireties.

TECHNICAL FIELD

This disclosure generally relates to unmanned platforms (e.g., a ballooncraft) operating in the atmosphere, and more particularly, to avoidance of collision of such platforms with another object, e.g., an aircraft.

BACKGROUND ART

Some lighter-than-air (LTA) platforms and devices have traditionally been used for gathering weather data in the upper atmosphere and generally, have been designed for short duration flights to provide a snapshot of weather data over the flight duration. In general, an LTA platform includes an unmanned ballooncraft that carries an LTA gas enclosure (e.g., a balloon) and payload components. The payload, typically, provides the data gathering and processing capabilities. The durations of flights for LTA platforms including ascents and descents have been limited by technology, and designs of the LTA gas enclosures which need to sustain low pressures in the upper atmosphere. As the technology and designs for LTA gas enclosures have improved, the flight durations have increased significantly. Rates of ascent and/or descent of these LTA platforms can be controlled and so also their altitude. Thus, it is possible to keep an LTA platform at a particular height in the upper atmosphere over long periods of time-days and even months.

These capabilities for flying and maintaining the flights of LTA platforms has led to other uses for such platforms including providing surveillance and/or communications services using one or more of such LTA platforms held in sustained flights at a desired altitude. With sustained flights for LTA platforms, however, come possibilities of collisions with a powered aircraft that may carry passengers. Such collisions can be hazardous and may result, in extreme cases, in loss of life and valuable property. It is therefore, important to provide systems and methods that can minimize the possibility of hazardous collision between an LTA platform and a powered aircraft in shared airspace.

SUMMARY

Among other things, this disclosure provides embodiments of systems and methods for assuring compliance of lighter-than-air devices carrying payloads with aviation regulations.

In various embodiments, a method may include determining if an in-flight aircraft is within at least a safety zone associated with a floating platform, wherein the floating platform comprises releasably-coupled component parts. Upon determination that the in-flight aircraft is within at least the safety zone, the method may further include activating a release mechanism. The release mechanism is configured to uncouple the component parts.

In an embodiment, at least one of the component parts has a weight or density less than a certain value. In an embodiment, the floating platform includes a balloon. In one embodiment, the release mechanism is configured to uncouple at least one of the component parts by a certain distance from at least one of the other component parts. In an embodiment, the release mechanism is configured to uncouple a second of the component parts after a certain time period following an uncoupling of a first of the component parts.

In an embodiment, determining if the in-flight aircraft is within at least the safety zone includes processing a probability of a collision between the floating platform and the in-flight aircraft based on a certain threshold value. In an embodiment, the threshold value is based on a minimum in-flight separation between the floating platform and the aircraft mandated by a regulatory agency. In an embodiment, the method further includes determining the probability of collision between the aircraft and the floating platform. Determining the probability of collision may include obtaining a current position and a flight vector of the floating platform, obtaining a relative position of the aircraft relative to a current position of the floating platform, and a relative flight-path vector of the aircraft relative to the flight vector of the floating platform, and determining the probability of a collision between the aircraft and the floating platform based on the relative position of the aircraft and the relative flight-path vector of the aircraft.

In an embodiment, the method may further include determining a closest horizontal approach distance between the floating platform and the aircraft based on a current position of the floating platform, a flight vector of the floating platform, a relative position of the aircraft, and a relative flight-path vector of the aircraft. A time until closest approach is then determined based on the relative flight-path vector of the aircraft. The method further includes determining altitude difference between the floating platform and the aircraft based on the relative position and the relative flight-path vector. The release mechanism is then activated based on if one or more of the closest horizontal approach distance between the floating platform and the aircraft, the time until closest approach, and the altitude difference are each within a certain respective range of values.

In an embodiment, the method may further include obtaining a current position information of the floating platform, obtaining a current position of the aircraft, determining a relative horizontal distance and a relative vertical distance between the floating platform and the aircraft and activating the release mechanism based on whether the relative horizontal distance or the relative vertical distance is less than a certain threshold value.

In an embodiment, the floating platform may include a power supply, a battery, a ballast system, an antenna system, an electronic system, a processor, a housing, or any combination thereof. In an embodiment, at least one of the component parts is couple to a recovery system.

In an embodiment, the release mechanism may include at least one of an electrical connector, a magnetic connector, an electromagnetic connector, a pneumatic connector, and a hydraulic connector, wherein a connector of the release mechanism is configured to uncouple upon activation of the release mechanism. In an embodiment, the release mechanism may include at least one of a solenoid, a motorized drum, a spring loaded blade, a thermal cutter, an electrically releasable glue, a magnetically releasable fastener, and a chemically releasable fastener.

In an embodiment, the component parts are coupled using spring loaded connectors. In an embodiment, the component parts are coupled using a cord configured to be severed upon activation of the release mechanism. In an embodiment, activating the release mechanism may include releasing the one or more component parts from the floating platform responsive to a determination that the aircraft is within a collision zone associated with the floating platform. In an embodiment, activating the release mechanism may include separating the one or more component parts from the platform responsive to a determination that the aircraft is within the safety zone associated with the floating platform, wherein separating the one or more component parts is performed such that the separated component parts remain attached to the platform by a wire. In an embodiment the said separating may include sequentially separating the one or more component parts from the platform. In an embodiment, the release mechanism may be configured to be activated remotely from a ground-based controller or another floating platform. In one or more embodiments, a floating platform may include releasably-coupled component parts, and a release mechanism configured to uncouple the component parts upon activation in response to occurrence of a pre-determined event. The pre-determined event may include a determination that an aircraft is at least within a safety zone relative to the floating platform.

In an embodiment, the pre-determined event may further include one or more of (i) a command received from a ground station in communication with the floating platform, (ii) a mission termination command, and (iii) a determination that the floating platform has entered a prohibited or restricted airspace.

In an embodiment, the floating platform may include at least a second release mechanism configured to uncouple the component parts upon activation in response to occurrence of the pre-determined event in the event that the release mechanism fails to activate.

In an embodiment, a system may include a floating platform including releasably-coupled component parts, a release mechanism configured to uncouple, upon activation, at least one of the component parts, and a controller. The controller is configured to activate the release mechanism in response to occurrence of a pre-determined event. The predetermined event may include a determination that an aircraft is at least within a safety zone relative to the floating platform.

In an embodiment, a computer-readable medium is disclosed. The computer-readable medium may include a computer-readable code physically embodied thereon. The computer-readable code, when executed by a processor causes the processor to determine if an in-flight aircraft is within at least a safety zone associated with a the floating platform, wherein the floating platform comprises releasably-coupled component parts; and responsive to a determination that the in-flight aircraft is within at least the safety zone, activate a release mechanism. The release mechanism is configured to uncouple the component parts.

BRIEF DISCUSSION OF THE DRAWINGS

In the present disclosure, reference is made to the accompanying drawings, which form a part hereof. In the drawings, similar symbols typically identify similar components, unless context dictates otherwise. Various embodiments described in the detailed description, drawings, and claims are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein.

DETAILED DESCRIPTION

Figure 1:
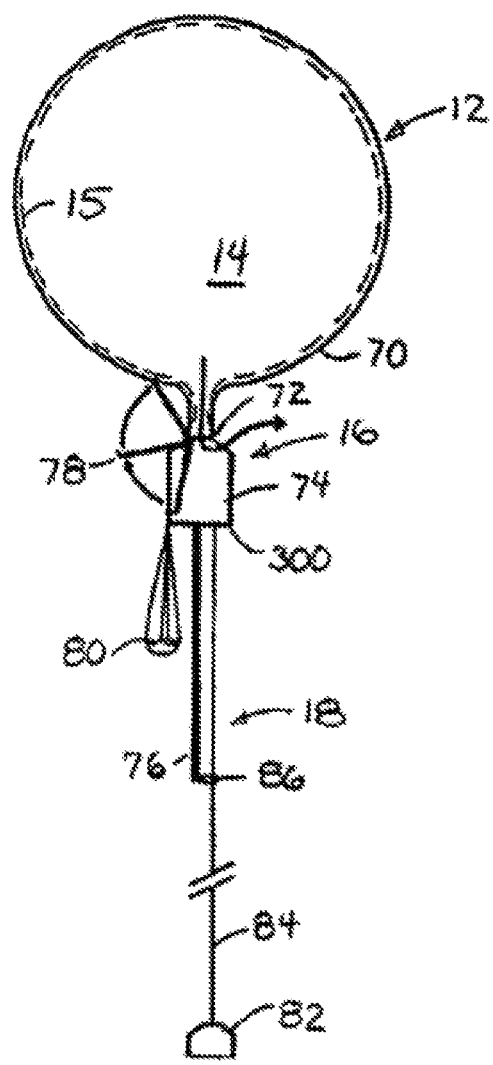
FIG. 1 shows a schematic side elevation view of a floating platform according to an embodiment of the present disclosure.

Before the present methods and systems are described, it is to be understood that this disclosure is not limited to the particular processes, methods and devices described herein, as these may vary. It is also to be understood that the terminology used herein is for the purpose of describing the particular versions or embodiments only, and is not intended to limit the scope of the present disclosure which will be limited only by the appended claims. Unless otherwise defined, all technical and scientific terms used herein have the same meanings as commonly understood by one of ordinary skill in the art.

It must also be noted that as used herein and in the appended claims, the singular forms "a", "an", and "the" include plural reference unless the context clearly dictates otherwise. Thus, for example, reference to a "balloon" is a reference to one or more balloons and equivalents thereof known to those skilled in the art, and so forth. Nothing in this disclosure is to be construed as an admission that the embodiments described in this disclosure are not entitled to antedate such disclosure by virtue of prior invention. As used in this document, the term "comprising" means "including, but not limited to."

A "floating platform" as used herein refers to a platform configured to float in earth's atmosphere. It is to be noted that in various embodiments described herein, the phrase "floating platform" refers to platform, and that in a given embodiment, the platform may be floating in the earth's atmosphere, ascending through the earth's atmosphere, or descending through the earth's atmosphere. A "free-floating platform" as used herein refers to a floating platform without substantial control over longitudinal or latitudinal movement. A floating platform, in various embodiments, may include, without limitation, an aircraft with a payload, partial lift platforms (with or without propulsion), powered lighter-than-air devices (with or without propulsion), and so forth.

As used herein, the term "aircraft" includes, without limitation, a vehicle capable of aerodynamic flight such as, for example, powered and unpowered crafts, air planes, helicopters, gliders, and the like; lighter-than-air devices; thrust-only vehicles such as, for example, hovercrafts, vertical take-off and landing aircrafts, and the like; ballistic trajectory vehicles such as, for example, rockets, missiles, dropped items, and the like; and/or any combination thereof.

As used herein, the term "lighter-than-air device" (LTA device) refers to a device that has an average density less than that of air at the sea-level. Therefore, buoyant forces pushing an LTA device up are greater than or equal to its gravitational pull. An LTA device without a payload, therefore, rises if allowed to freely float. Examples of LTA devices include, but are not limited to, balloons, ballooncrafts, blimps, aerostats, zeppelins, airships, dirigibles, jimspheres, hot air balloons, sounding balloons, free drifting balloons, meteorological balloons, etc.

As used herein, the term "payload" refers to a part of the floating platform and includes, without limitation, various electronic, mechanical and electromechanical components, a structural frame or enclosure for the various components, a release mechanism for releasing the components or the entire payload from the platform, and the like. In various embodiments, portions and components of the payload may be located in separate parts of the platform (e.g., at the bottom of the on top of the aircraft, on or inside a lifting gas envelope of a balloon, etc.).

As used herein, "float location" of a floating platform refers to the location with respect to earth's surface (e.g., latitude and longitude coordinates, and such) at which the floating platform is floating in the earth's atmosphere. "Float altitude" refers to the height with respect to sea level, at which the floating platform is floating.

"Rise rate," interchangeably used with the term "ascent rate" of the floating platform refers to the rate at which the floating platform rises in the earth's atmosphere. Ascent rate is typically measured in feet/minute or meters/minute. Likewise, "descent rate" refers to the rate at which the floating platform descends through the earth's atmosphere towards the earth's surface.

A "recovery system" as used herein, refers to components of the platform that may be activated during recovery of one or more portions or components of the payload. Examples of recovery system may include, but not limited to, parachutes, streamers, drag creating devices, gliders, steerable parachutes, flying wing(s), powered and unpowered aircrafts, and the like, or any combination thereof.

As used herein, a processor refers to a machine for data processing. For example, the processor could be a microprocessor chip.

Unmanned lighter-than-air ballooncraft have been used for many years to perform tasks such as near space research and meteorological measurements. Such ballooncraft have even carried payloads with instrumentation that sometimes includes radio transmission capabilities.

FIG. 1 shows a schematic side elevation view of a lighter-than-air platform 12 in an embodiment in which the low-density gas enclosure 70 may be an extensible balloon 70. An extensible balloon filled with hydrogen, helium, natural gas, or another suitable low density gas or mixture adequately provides lift for the free-floating platform. The extensible balloon is released with a diameter of about six feet and expands to about thirty two feet across at about 100,000 feet altitude. It will be noted that other lighter-than-air enclosures, such as blimps, aerostats, zeppelins, airships, dirigibles, weather balloons, jimspheres, hot air balloons, sounding balloons or meteorological balloons might also be used in place of the proposed extensible balloon 70. It is expected that a total platform weight, including the payload box 300, altitude control vent mechanism 72, meteorological package 82, antennae 76 and meteorological cable connection 84, may be in excess of about 15 lbs. In some embodiments, the cable 84 may be a fiber optic cable having a suitable length (e.g. about 25 meters) so that the meteorological data collection package 82 can be sufficiently distanced from the balloon 70 to reduce the effect of turbulence caused by the balloon on the meteorological data sensed by the meteorological package 82. The fiber optic cable 84 may be used to transmit the meteorological data from meteorological package 82 to the communications unit 74. Advantageously, the use fiber optic cable prevents arcing which may occur in a metal wire due to the high electric field potential when passing through thunderclouds. Alternatively, 82 may be a ballast container in which ballast may be released as required.

There are numerous types of low-density gas enclosure devices that might be considered useful for the devices and systems described herein. Among the potentially preferred types of balloons are rubber pressure balloons, zero pressure balloons, internal air bladder balloons, adjustable volume balloons and super pressure balloons. Each type of these balloons has different advantages and disadvantages and, for purposes of presently disclosed embodiments, any of the various types of balloons may be potentially used depending on factors such as desired duration of flight, total platform weight, and so forth.

In some embodiments, rubber pressure balloons may have a stretchable rubber membrane containing the lifting gas that allows the balloon to increase in size with decreasing external air pressure as the balloon rises. This is the most common type of weather balloon. Primary advantages of such balloons include low cost and common accessibility. These balloons are somewhat fragile and they have delicate handling requirements and also low extended reliability. Further, the use of such balloons requires venting of the lifting gas to prevent bursting upon reaching desired altitudes.

In some embodiments, zero pressure balloons may include an initially loose bag, usually made from a plastic such as polyethylene or Mylar. As the external air pressure decreases, the bag increases in volume. In such balloons, once the bag reaches its whole volume, gas must be vented to prevent to the balloon from bursting since the bag material does not stretch. Although this type of balloon may be more reliable than the rubber balloons over longer durations, and provide less diffusion of the lifting gas, such balloons are currently between about four to ten times more expensive. Thus, although the rubber balloon might be more preferred for purposes of low-cost platforms, the zero-pressure balloon also provides a useful enclosure for lifting the platform up and has certain advantages over the rubber pressure balloons.

In various embodiments, internal air bladder balloons may include a flexible balloon containing air enclosed in a fixed volume balloon contain a lifting gas. Air is pumped into the inner-flexible balloon, which compresses the lifting gas trapped in the fixed volume balloon, thereby decreasing the overall lift. Air is let out of the inner-flexible balloon to increase lift. Typically, blimps adjust lift using this principle. This type of balloon has certain advantages as there is no lift gas lost when reducing lift and it is potentially more reliable than rubber balloons. Such internal bladder balloons, however, are more costly due to extra balloon, pump and extra required power for operating the altitude control mechanism.

In some embodiments, adjustable volume balloons may include a fixed volume containing the lifting gas and a mechanical way of reducing the volume of the balloon. By decreasing the volume, the lifting gas is compressed, thereby decreasing the lift. The volume may be reduced any number of ways, including an adjustable line inside the balloon from the top of the balloon volume decreases. This has less diffusion of the lifting gas, theoretically, lifting gas is not lost when reducing lift and it may be more reliable than rubber balloons. Adjustable volume balloons, however, are significantly more costly due to the mechanical volume reducing mechanism and further, may require extra power for operation of such a mechanical volume-reducing mechanism.

In some embodiments, super pressure balloons may have a fixed volume. They are called super pressure balloons because they do not expand to match the decreasing exterior pressure. They are built strong enough to hold the increased pressure. Super pressure balloons can achieve extremely long float lies because they do not need to vent gas to prevent bursting and they typically have very low membrane gas diffusion. These types of balloons have the highest cost. They, however, are one of the most reliable balloons, with little loss of lifting gas. These balloons may have an internal air bladder as well.

In various embodiments, the payload may include, without limitation, communication electronics such as one or more antennas and routers; one or more processors; one or more batteries; one or more power supplies; an on-board data storage such as a memory; one or more photovoltaic cells or panels; radar system(s); a positioning system such as a global positioning system and/or a star-tracking system; motion sensors such as accelerometers, magnetometers, gyroscopes, etc.; optical systems such as lights, video and/or still cameras; environmental sensors for measuring parameters such as pressure, humidity, temperature, altitude, and/or wind-speed; an altitude control system; a launch and/or recovery window prediction system; a payload splitting system; and the like.

Figure 2:
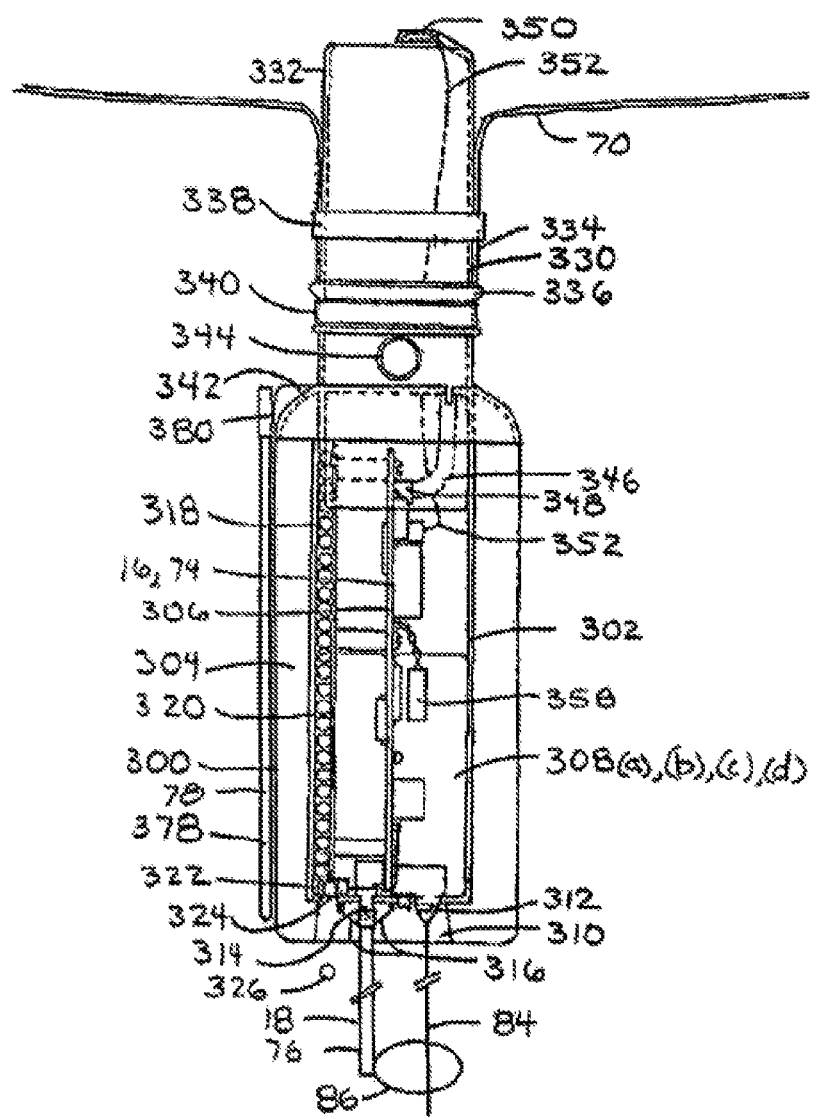
FIG. 2 depicts a payload box associated with a floating platform according to an embodiment of the present disclosure.
Figure 2A:
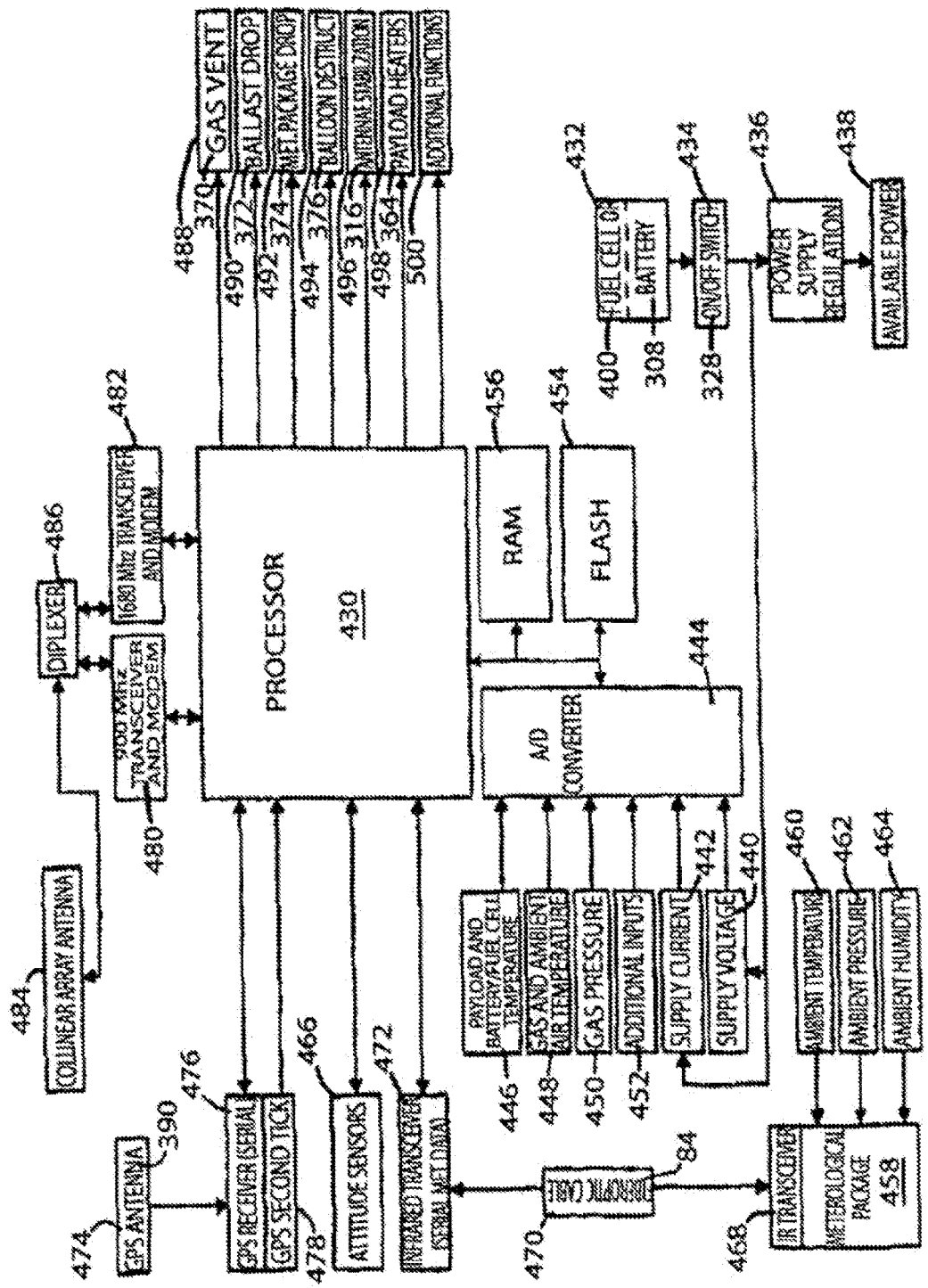
FIG. 2A depicts a schematic block diagram of the hardware contained within a payload box associated with a floating platform, according to an embodiment of the present disclosure.

Embodiment in FIG. 2 depicts a payload box and FIG. 2A depicts a schematic block diagram of the hardware contained within a payload box and placed on or interconnected with circuit board. A processor 430 receives electrical signal input and provides electrical signal output, interacting with a plurality of components for both controlling the flotation altitude, temperature, balloon destruction, ballast drop, release of various payload components, etc. of the platform, and also for receiving, processing and transmitting communication signals received and transmitted to and from ground stations, personal communication devices or other information communications. Block 432 represents either batteries 308 or fuel cell 400. Block 434 represents the on/off switch 328 to activate providing power to a power supply regulation circuit 436 with output available power 438. For clarity, individual power connections to various operational and control devices have not been shown in all instances. Power is provided to the supply voltage sensor at block 440 and current supply sensor block 442, which provide information to an analog to digital (A2D) converter 444. The A2D converter may variously receive information from the payload and battery fuel cell temperature gauge at block 446, both gas and ambient air temperature readings at block 448 and gas pressure at block 450. Additional analog informational signals are generally represented by block 452. Digitally converted information may be variously provided to and received from flash memory at block 454 and random access memory (RAM) at block 456. From A2D converter 444 and also from the flash memory 454 and from RAM memory 456, the processor has access to all the various input control data. During the ascent of the LTA device, the meteorological package represented by block 458 receives appropriate weather information including ambient temperature at 460, ambient pressure at 462 and ambient humidity at 464. The antenna stabilization 316 represented by block 496 may rely upon the attitude sensor information that is part of the LTA device control system at 466 to stabilize the antenna 76. Information sensed or gathered by the meteorological package 458 is transmitted. For example, the infrared transceiver 468 through a fiber optic cable at block 470 corresponding to physical fiberoptic cable 84 and a processor infrared transceiver 472 by which serial meteorological data is transferred to the processor 430 for appropriate transmission to ground terminals during the ascent of the LTA device with the meteorological package 458 attached. A GPS antennae block 474, corresponding to physical GPS antennae 390, communicates through a GPS receiver 476, indicated as a serial port and further synchronized with a GPS clock or seconds tick at block 478. Thus, the position at particular times is provided to the processor. This positioning information is coordinated with the other meteorological input for determining wind speeds steering any part of the ascent, thereby corresponding those wind speeds to particular altitudes and geographical locations during the ascent.

Communications may be controlled by processor 430, using e.g., a 900 MHZ transceiver and modem 480. Gateway transceiver and modem 482. Signals to and from co-linear array antennae 484 may be interfaced through a diplexer 486. Control information received at co-linear array antennae 484 may, therefore, be transferred through the diplexer and one of the appropriate frequency transceivers to the processor 430 with input information from ground signals and also from the onboard sensors as provided through A2D converter 444, the GPS position information from 476, the GPS time information 478 and the attitude sensor information 466. Various functions of the floating platform can, thus, be controlled, including the gas vent at block 488 corresponding to the gas vent actuator 370. The ballast drop is controlled at block 490 corresponding to the physical ballast drop actuator 372. The meteorological package drop is controlled at block 492 corresponding to the package drop actuator 374. The balloon destruct control is depicted at block 494 corresponding to the destruct actuator 376. Antennae stabilization may be affected according to controls at block 496 corresponding to the antennae stabilization mechanism 316. Payload temperature controls, both heating and cooling, may be controlled at block 498 corresponding to heaters and coolers 364. Additional functions as may be additionally included, are provided with controls at block 500.

In some embodiments, the floating platform may form a part of a communication system. In an embodiment, a communications system may include a plurality of lighter-than-air platforms comprising at least a first platform and a second platform. The first and the second platforms each may include a communication signal transceiver configured to wirelessly communicate with a communication device on the ground or between platforms, and an altitude control mechanism. The first and the second platforms may be to be operational in an altitude range of about 60,000 feet to about 140,000 feet. In operation, the altitude control mechanism controls an altitude of the respective platform within the altitude range, and the first and second platforms substantially drift along with wind currents. In some embodiments, the communication system may further include a plurality of communication devices within a contiguous geographic area. The plurality of communication devices may be configured to communicate with the plurality of lighter-than-air platforms.

In some embodiments, the first platform or the second platform is configured to operate without longitudinal position control. In some embodiments, the first platform or the second platform is configured to operate with latitudinal position control.

In some embodiments, the altitude control mechanism includes quantity of contained gas having a density less than the density of air within the altitude range and a controllable vent by which a portion of the quantity of contained gas can be released to reduce the buoyancy of the platform. In other embodiments, the altitude control mechanism includes a quantity of high density matter carried onboard the platform and a release device by which a portion of the high density matter can be released to increase buoyancy of the platform.

In an embodiment, responsive to the first platform becoming out of communication range of the communication device, a communication link between the first platform and the communication device is handed-off to the second platform.

In an embodiment, a communication system may comprise a plurality of lighter-than-air platforms including at least a first platform and a second platform. The first and the second platforms may each include a balloon and a communications signal transceiver configured to wirelessly communicate with a communication device on the ground. The first and the second platforms are to be operational in an altitude range of about 60,000 feet to about 140,000 feet. In operation, the first and second platforms substantially drift along with wind currents, and responsive to the first platform becoming out of communication range of the communication device, a communication link between the first platform and the communication device is handed-off to the second platform.

In an embodiment, a floating platform may include a balloon, a communication signal transceiver configured to wirelessly communicate at least with a communication device on the ground, and an altitude control mechanism. The platform is to be operations in an altitude range of about 60,000 feet to about 140,000 feet, and the altitude control mechanism is configured to control an altitude of the platform within the altitude range. In operation, the platform substantially drifts along with wind currents.

It will be apparent to one skilled in the art that depending on the purpose of the floating platform, the payload can be fairly heavy. Various geographical and jurisdictional regulatory agencies such as, for example, the Federal Aviation Administration (FAA) (in the US) may limit the weight of ballooncraft payload unless strict reporting, launching, location reporting, and lighting guidelines are followed. The FAA limitations may be found in the FAA CFR Title 14, Part 101. Under these limitations, launches for payloads in excess of 6 lbs are not allowed through broken cloud layers, and aircraft transponders must be carried. These restrictions would not allow for launches through all weather conditions as would be required for robust and time-sensitive missions. The transponder and lighting requirements may take up over half the weight requirement, leaving little room for the mission payload weight. Other countries and jurisdictions may have similar restrictions.

The Federal Communications Commission (FCC) prohibits uncontrolled transmitters as they may cause interference to users on the same frequency or others on nearby frequencies. Further, FCC spectrum licenses generally prohibit a US licensed transmitter from transmitting when it leaves the border of the US.

It has been found that most lighter-than-air platforms that maintain altitude must drop ballast in order to maintain altitude as lifting gas is lost through the balloon membrane and as the heating effect of the sun is lost as night approaches. The Federal Aviation Administration (FAA) regulations Section 101.7 states that unmanned ballooncraft are prohibited from dropping objects or operation such that a hazard may occur.

Sec. 101.7 Hazardous Operations.

(a) No person may operate any moored balloon, kite, unmanned rocket, or unmanned free balloon in a manner that creates a hazard to other persons, or their property.

(b) No person operating any moored balloon, kite, unmanned rocket, or unmanned free balloon may allow an object to be dropped there from, if such action creates a hazard to other persons or their property.

(Sec. 6(c), Department of Transportation Act (49 U.S.C. 1655(c))) [0066] [Doc. No. 12800, Amdt. 101-4, 39 FR 22252, Jun. 21, 1974]

A major factor influencing the size and cost of a floating platform is the weight of the payload. For small ballooncraft such as weather balloons, they may become exempt from certain FAA reporting, lighting, and launching requirements if the total payload weight is kept below 6 lbs and a density of 3 ounces or less per square inch of the smallest side. Sec. 101.1 (4) Applicability.

This part prescribes rules governing the operation in the United States, of the following:

. . .

(4) Except as provided for in Sec. 101.7, any unmanned free balloon that—[0071] (i) Carries a payload package that weighs more than four pounds and has a weight/size ratio of more than three ounces per square inch on any surface of the package, determined by dividing the total weight in ounces of the payload package by the area in square inches of its smallest surface;

(ii) Carries a payload package that weighs more than six pounds;

[Doc. No. 1580, 28 FR 6721, Jun. 29, 1963, as amended by Amdt. 101-1, 29 FR 46, Jan. 3, 1964; Amdt. 101-3, 35 FR 8213, May 26, 1970]

Presently, the problem described is solved by (a) limiting payload weight and density to be exempt from FAR 10, which significantly limits the payload weight and density; (b) meeting the requirements of FAR 101, which is expensive, requires reporting of each flight, a transponder and power supply, has lighting requirements, limits the launches to daytime, and other restrictions that would severely impact operations; or (c) applying for a waiver, which have generally only been granted for specific flights, and not large groups of flights.

All commercial aircraft, all instrument flight rules (IFR) aircraft, all aircraft operating in Class B or C airspace, and all aircraft operating above 18,000 feet are required to carry an aviation transponder. Every time a transponder-equipped aircraft is "painted" by FAA radar, the transponder transmits its current altitude and identification code. This allows the radar to determine not only the aircraft's position, but also the aircraft altitude and identification.

Disclosed herein are methods, systems and devices separating and/or releasing one or more component parts of a payload carried by or located on or in a floating platform upon determination of an aircraft entering a zone or zones around the floating platform, or an imminent collision with an aircraft or upon descent or nearing the ground.

One type of conventionally available collision avoidance device for aircraft decodes the return messages of other aircraft in the area and calculates and displays their distance and altitude to the pilot. Such a device is called a transponder decoder. In recent times, transponder decoder devices have become relatively small and commercially available. In an embodiment, a transponder decoder such as, for example, the Zaon PCAS MRX collision avoidance device is included with the payload of the floating platform.

Figure 3:
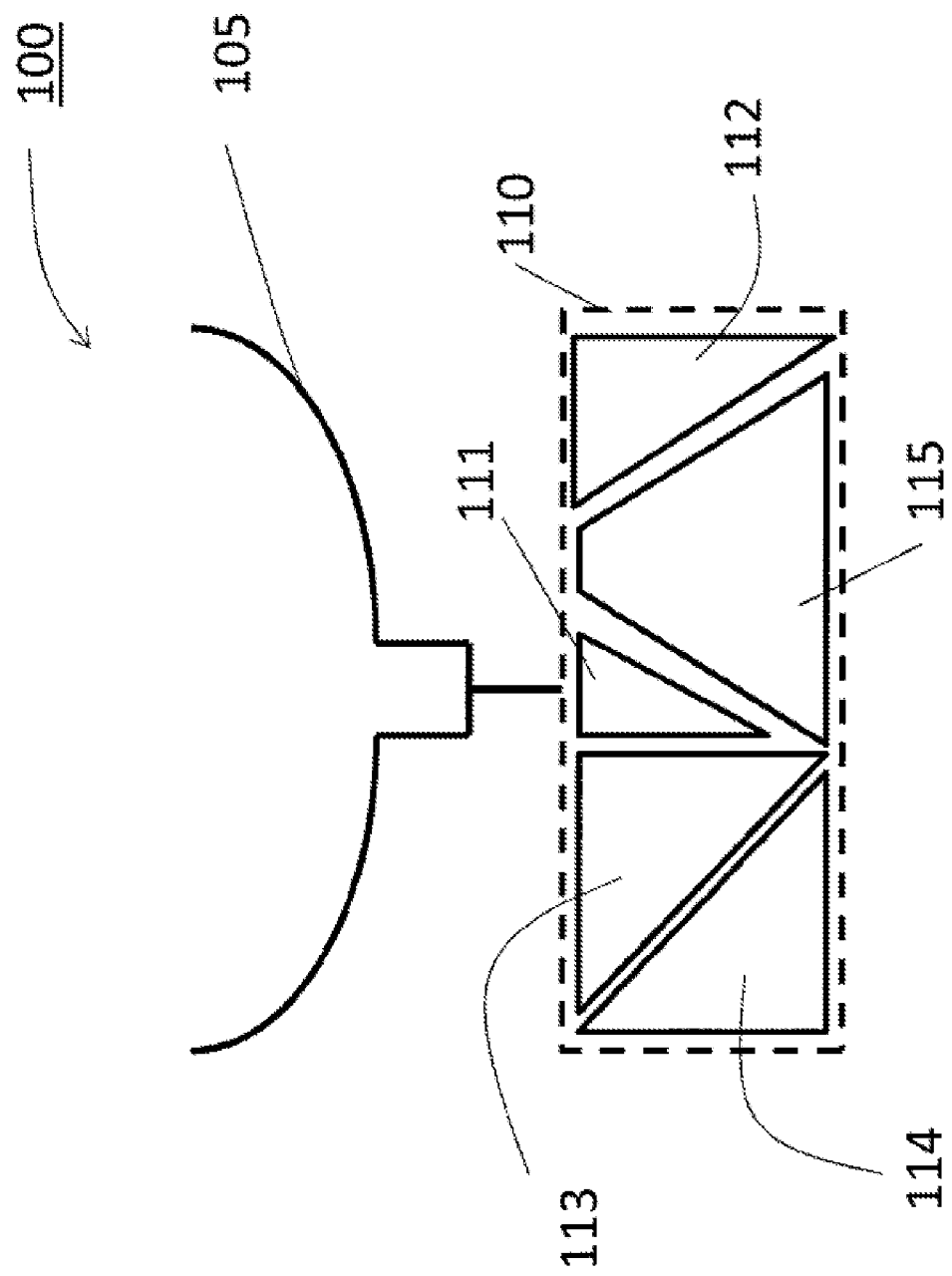
FIG. 3 depicts a schematic of a floating platform with releasably-coupled component parts, according to an embodiment of the present disclosure.

In an embodiment, as shown in FIG. 3, a floating platform 100 may include, a balloon 105, and in addition to the above mentioned components, a transponder decoder, logic circuits, release mechanisms and appropriate power supplies. These and other components may be housed in or on a payload box or an enclosure 110. Several of the payload components can be grouped together to form two or more separable components 111, 112, 113, 114, and 115 while assuring proper weight and/or density distribution for the payload. The exact placement and connections between the units can be determined by a person with skill in the art in order to assure proper weight and/or density distribution for the payload and antenna placement for the transponder.

The various components may be distributed such that each of the components has a weight and/or density less than a threshold. The threshold weight or density may be determined based on, for example, regulatory requirements of various agencies or jurisdictions, or other similar factors. In some embodiments, the payload may be distributed such that each of the components has a certain density profile. In some embodiments, the payload may be distributed such that each of the components has a volume or a volume profile (i.e., area) no greater than a threshold. In some embodiments, each of the components may have a predefined limitation on its composition (e.g., each component may not have more than 10 g of lead, or each component may not have more than 400 g of metal, etc.). In some embodiments, the payload may be distributed by function such that a particular component part performs a pre-defined function (e.g., a power-supply component, a transmission component, an altitude control component, etc.). Alternatively, in some embodiments, each of the components may be designed to be self-sufficient (e.g., each component has its own power supply and transceiver) such that the payload may continue to at least partially function despite jettisoning of one of the components. In some embodiments each of the components may be designed to have a particular shape (e.g., streamlined for descent, designed to increase drag, designed to have no hard edges or points to reduce damage on impact, etc.). One of skill in the art will appreciate that this configuration is merely an example, and not meant to be limiting. Other configurations will be readily apparent to one of skill in the art, and will depend on factors such as, for example, mission criticality of various components, and weight and/or density of various components.

Figure 3A:
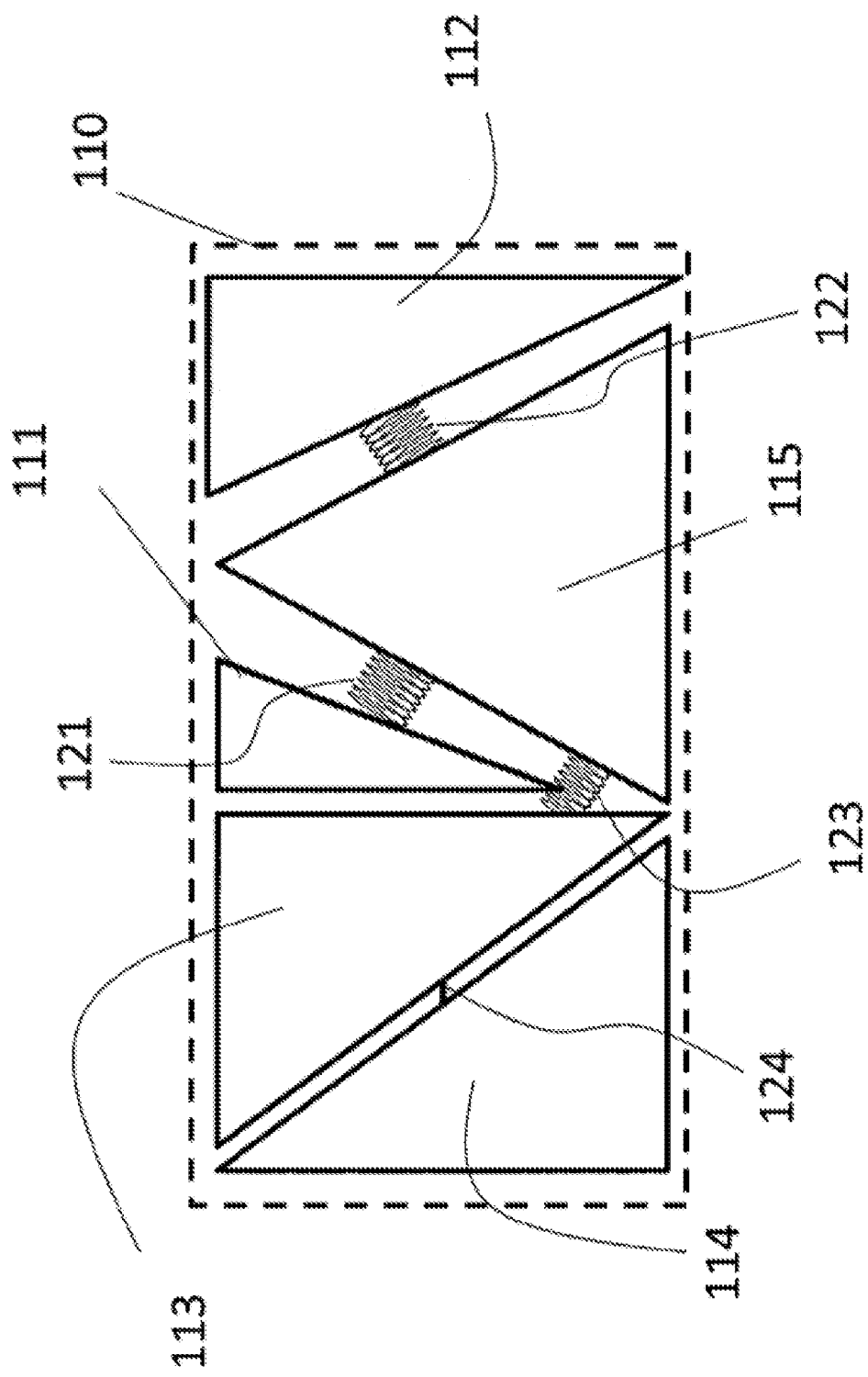
FIG. 3A depicts a schematic of various releasably-coupled component parts according to an embodiment of the present disclosure.

In various embodiments, release mechanisms 121, 122, 123, and 124, depicted in FIG. 3A, may function to release one or more components from the payload such that the released component(s) descend/s under gravity, in some cases, on a recovery system (not explicitly shown). Additionally, or alternatively, the release mechanism(s) may function to separate one or more components from the payload without releasing them such that the separated components release from the payload, but remain attached to the platform via one or more lines or other provisions. The employed release mechanism(s) may be selected from established or new methods of separating two or more objects from each other. Release mechanisms may include, for example:

(1) Various components may be spring loaded with pull apart electrical, pneumatic, or hydraulic connectors between the components as needed. A solenoid may be configured to act as a release mechanism allowing the springs to push the components away from each other. Each component may then be configured to descend under gravity on its own recovery system (e.g. parachute or maple-leaf recovery system);

(2) Various components may be held together with a cord that laces through each component. A cord cutter (e.g., thermal cutter, spring loaded blade, magnetic release, electrically releasable glue, chemically releasable glue, etc.) may be configured to cut the cord, allowing individual components to separate and come down under gravity using a controlled recovery system. The components may also be spring loaded in order to overcome friction of electrical or mechanical connectors between the components;

(3) Various components may be held together with a cord that laces through each component. When the balloon is released from the payload components, the same release mechanism that releases the balloon may be configured to release the cord that holds the components together;

(4) Various components may be glued together (or to the payload, or platform). The glue may be electrically, or chemically releasable;

(5) Various components may be held together with a cord rolled on a motorized drum. When the motor is activated, various components may be released together or sequentially;

(6) Multiple cords may be laced through a combination of components (e.g., one cord from communications related components, one cord from weather sensing related components, one cord from altitude control mechanisms, etc.). Each of the cords may have a separate release mechanism similar to any one of the mechanisms described herein;

(7) Entire payload or groups of components may be release while connected together. The released payload may have an aerodynamic shape that causes spinning as it falls under gravity. While the payload is spinning, components are released and centrifugal forces fling components outward.

In various embodiments, one or more components of the payload may be released or separated at the same time, sequentially, or individually. In some embodiments, all of the components of the payload may be released at the same time. In such embodiments, payload may be distributed into a large number of small, low-weight, low-density components. Since the released components will, typically, be horizontally spaced apart as they descend, such a release mechanism, however, carries a risk of one another aircraft hit multiple components as the fall as the aircraft movement is essentially horizontally. On the other hand, if an aircraft is at the same altitude or immediately below the platform, such a release mechanism may push the components sufficiently apart to completely avoid the aircraft.

In some embodiments, various components may be released or separated sequentially. Such embodiments allow vertical spacing between components as they fall under gravity. Such embodiments may also allow for controlled separation of multiple components on the same wire, whereby the separated components remain attached to the platform. Advantageously, since the components are on a single wire, tangling of wire, and components (and in case of release of components with recovery systems) may be prevented. In an example embodiment, components are tied to each other with separate strings. Each of the strings is spooled on a single spool. Upon activation, the spool releases the components one at a time.

In some embodiments, various components may be released or separated individually. For example, a payload may include multiple batteries, each of which can be separately released or separated as mission dictates. In addition, each battery or battery may be released after it's useful life is reached. In an example embodiment, each component has a separate string with its own release mechanism (e.g., a thermal cutter). In another example embodiment, each component is separately glued to the platform using, for example, an electrically releasable glue with individual circuits to release the glue for each component. In either of the example embodiments, the separated components may be ultimately tied to the platform via one or more lines, whereby the components remain attached to the platform. Alternately, the separated components may be released from the platform, whereby the components (e.g., ballast weight) descend back to earth under gravity with the help of a recovery system.

Each of the separation and/or release sequences has its advantages and disadvantages, and the choice of a particular release/separation sequence may depend on factors such as, for example, distance of the platform from other aircraft(s), probability of released/separated components colliding with another aircraft, criticality of components with respect to functioning of the platform, need for continued functioning of the platform despite release/separation, complexity and cost of the particular release mechanism, geolocation of the platform at the time of release (e.g., if the platform is over a restricted air space, or critical infrastructure), weight and/or density distribution of the components to be released, and so forth. In some embodiment, there may be one or more redundant release mechanisms present on the floating platform. Redundancy may, in some instance, be mandated by a regulating agency.

In various embodiments, a component may remain connected to the payload or other components after separation via one or more lines. The one or more lines may include strings, wires, fiber optic cables, tubing, etc. Lines may carry power, data, gases, rotary motion, vibration, etc. to allow continued full or partial operation of the component or components connected to the line. In various embodiments, one or more of the lines may contain dereelers or rubber components to reduce the shock upon full extension of the line/s. In various embodiments, line length and strength may be set greater than a threshold, and/or to meet a regulator requirement.

In various embodiments, one or more connectors may connect lines to components or to other lines. Such connectors may be adapted to transmit fluids, pressure, data, electrical power, light (e.g., connector for optic fiber cables), heat, rotary motion, etc. In some embodiments, connectors may slide apart, have a pre-set pull-apart resistance, have a spring contact, or may be magnetically coupled. Other connectors are contemplated.

Figure 4:
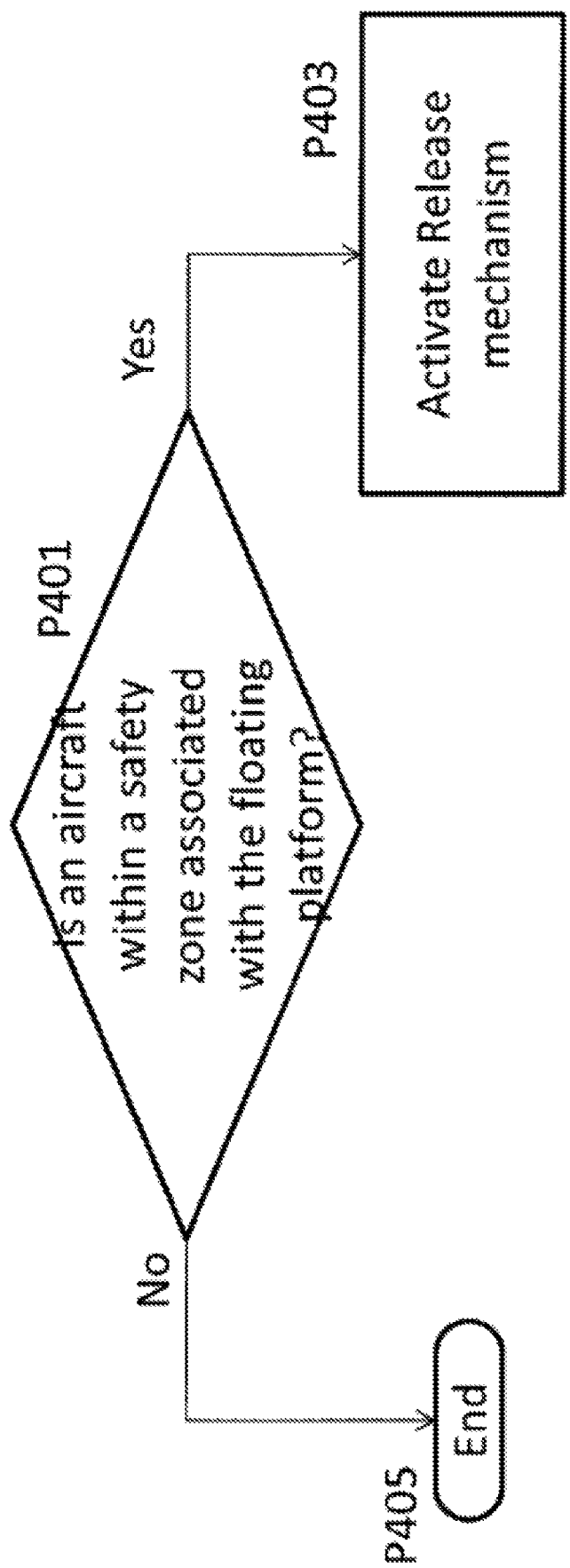
FIG. 4 depicts a flow diagram for method of breaking-up a floating platform for avoiding collision with an in-flight aircraft, according to an embodiment of the present disclosure.

FIG. 4 depicts a flow diagram for method of breaking-up a floating platform for avoiding collision with an in-flight aircraft, according to an embodiment disclosed herein. The method includes: at block P401, determining if an in-flight aircraft is within at least a safety zone associated with a floating platform, wherein the floating platform comprises releasably-coupled component parts. In response to a determination that the in-flight aircraft is within at least the safety zone, at block P403 activating a release mechanism. The release mechanism is configured to uncouple the component parts.

Figure 5A:
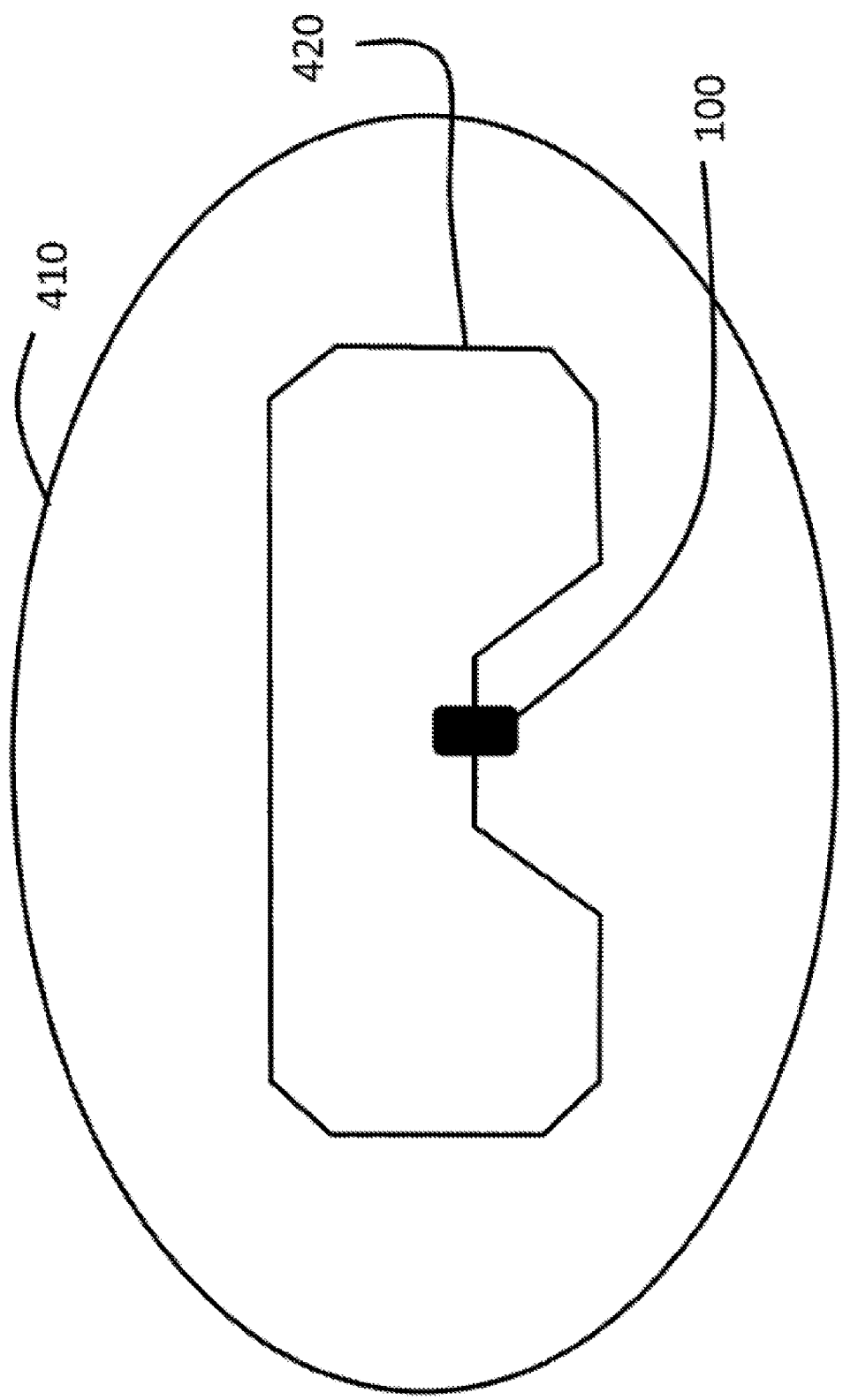
FIG. 5A depicts a lateral view of safety and collision zones associated with the floating platform according to an embodiment of the present disclosure.

The component parts may be distributed such that weight, density or other physical attributes of each of the component parts is less than a certain value. Physical attributes of the component parts may include, without limitation, weight of the part, density of the part, density profile of the part, composition of the part, volume of the part, volume profile of the part, shape of the part, and/or any combination thereof. Density profile indicates the distribution of density across the component part. Examples of various distribution As used herein, the term "near-collision" refers to a situation where a collision is not imminent, but increased safety precautions that do not necessarily terminate the mission of the platform are required. FIG. 5A depicts a lateral view of the space surrounding the floating platform according to an embodiment of the present disclosure. The space surrounding floating platform 100 may be classified into three zones: (i) collision zone 420; (ii) safety zone 410; and (iii) safe zone (all space outside of safety zone 410). Zones may be set based on physical distances (e.g., collision zone 420 extends 1 mile laterally around and 1000 feet above and below the platform); time to closest aircraft approach (e.g., collision zone 420 extends a distance X in all directions around the platform where X is calculated as a distance travelled by an aircraft toward the platform in a given amount of time, e.g., 2 minutes); aircraft closure rate; other variables, or a combination of variables. In various embodiments, zones may be changed based on the operating environment. Factors such as, time of the day (daytime versus night time), visual conditions (e.g., foggy, cloudy, or otherwise limited visibility conditions); airspace type (e.g., no-fly zones or otherwise restricted airspaces); population density at the geolocation of the platform, etc.

Figure 5B:
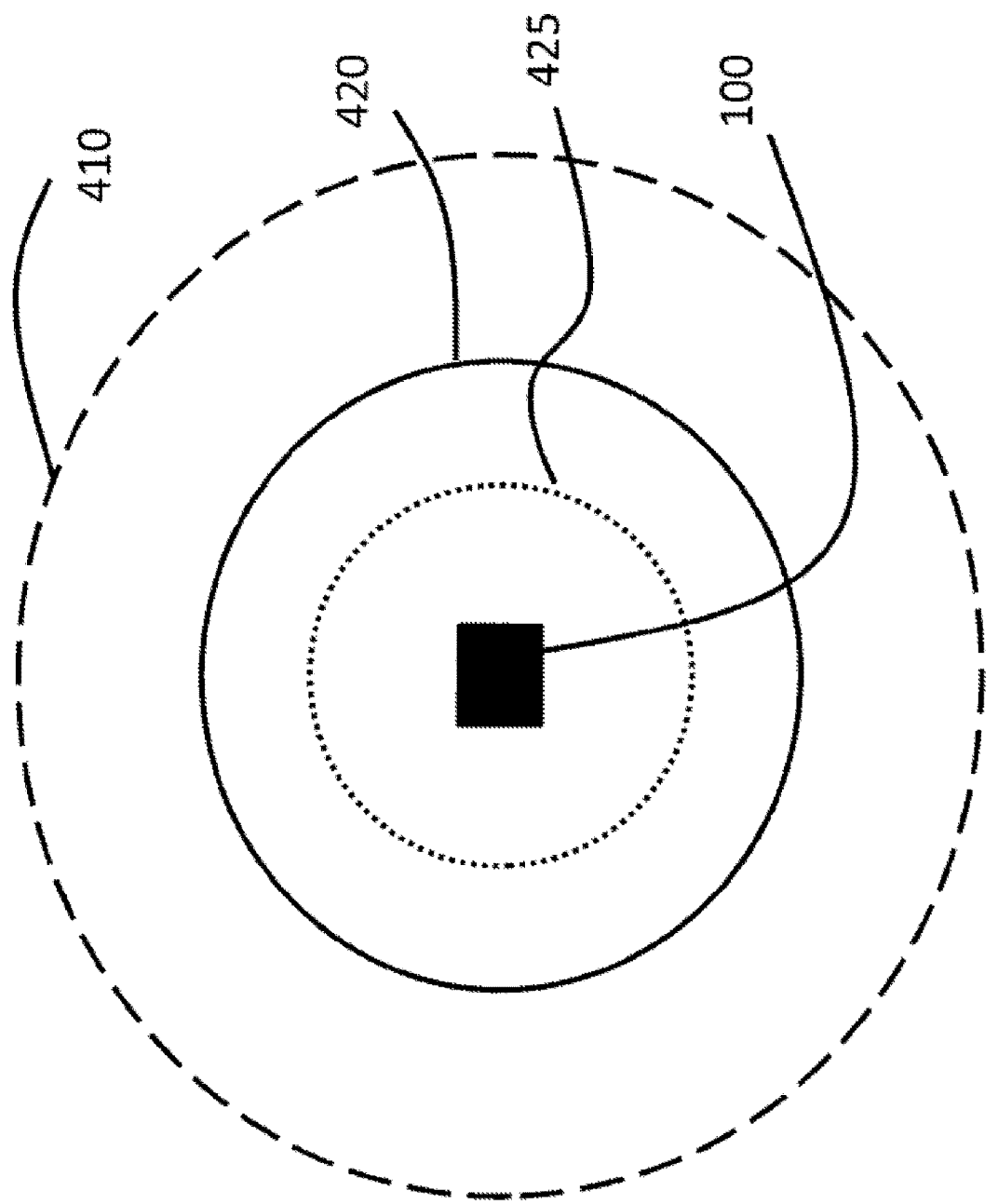
FIG. 5B depicts a top view of safety and collision zones associated with the floating platform according to an embodiment of the present disclosure.
Figure 6A:
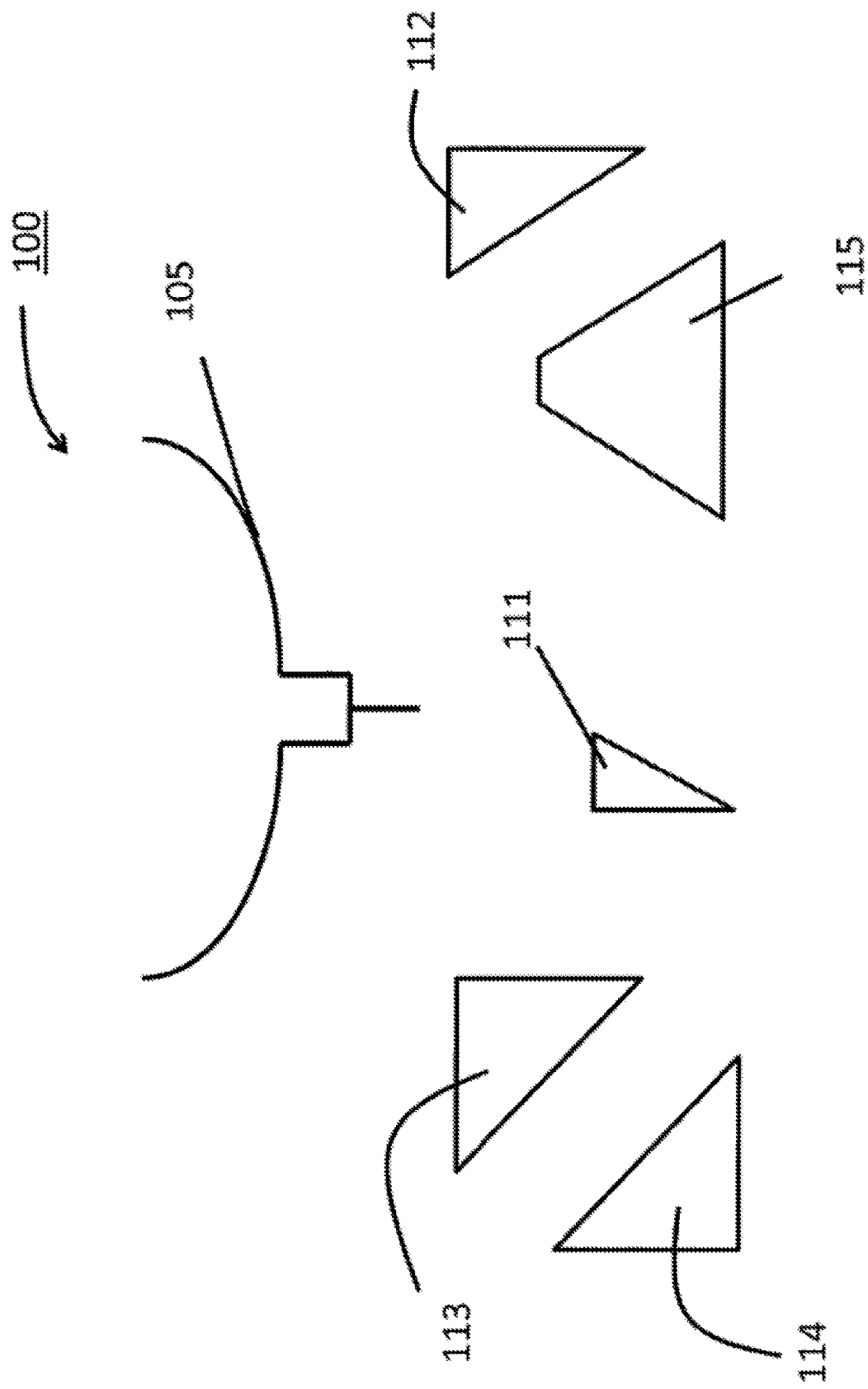
FIG. 6A depicts a schematic of a scenario where all of the component parts released from the floating platform according to an embodiment of the present disclosure.

Collision zone 420 may be defined as a space surrounding the floating platform defining a volume of unacceptably high risk of a collision (e.g., a probability greater than 60%) between the floating platform (and/or components of the platform if they were to be released) and the aircraft. In an embodiment, as illustrated in FIG. 6A, an aircraft in the collision zone may cause a separation or release of all components 111, 112, 113, 114 and 115 carried by floating platform 100. As illustrated in FIG. 5A, the collision zone 420 may exclude a volume of space 425 directly below the platform such that release of components, while an aircraft is directly below and close to the platform, is prevented. The excluded volume is more clearly illustrated in FIG. 5B which depicts a top view of the space surrounding floating platform 100.

Figure 6B:
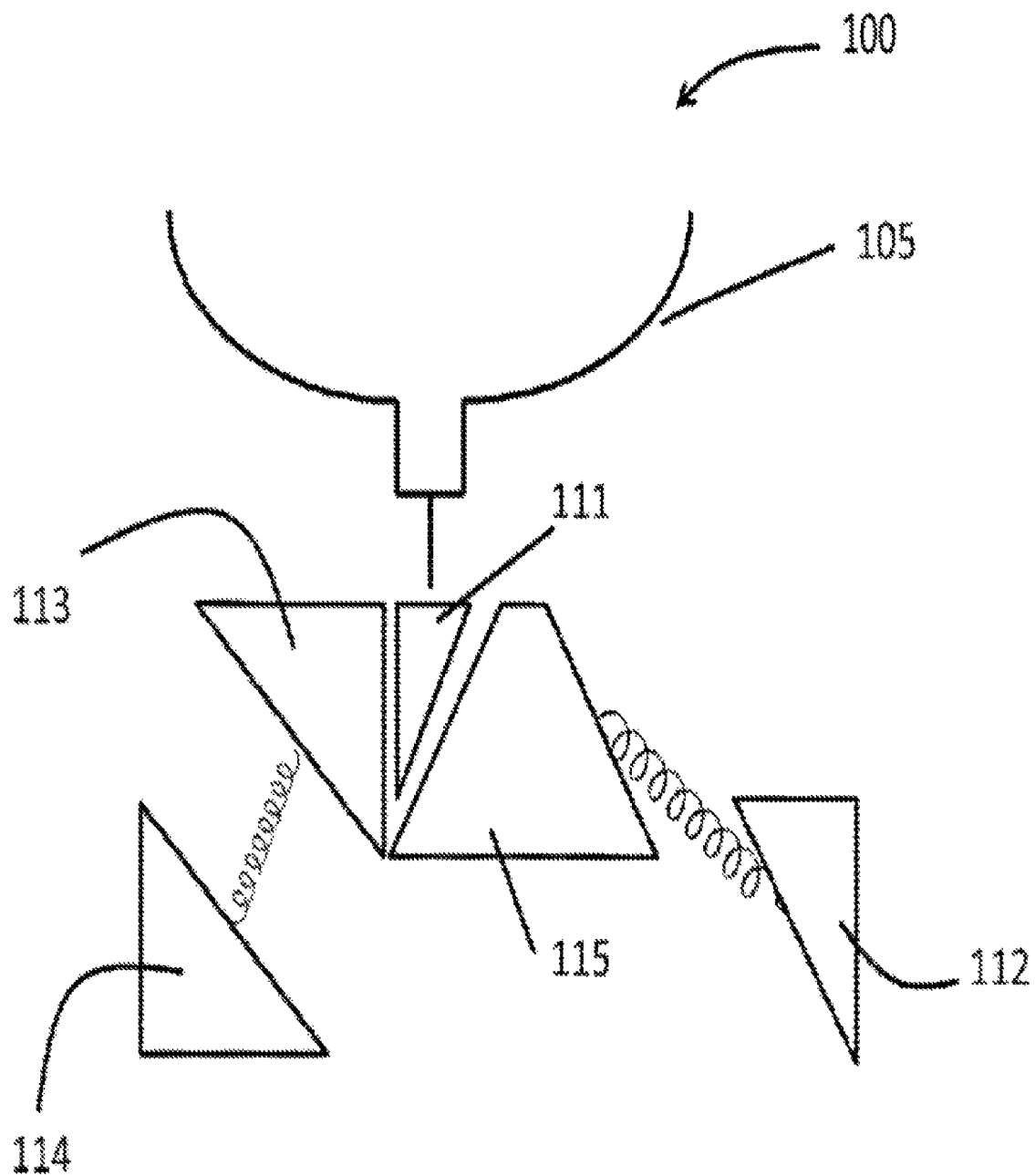
FIG. 6B depicts a schematic of a scenario where only a portion of the component parts released from the floating platform according to an embodiment of the present disclosure.

Safety zone 410 may be defined as a volume of airspace surrounding the collision zone defining an area where collision is not imminent, but increased safety precautions are required. Typically, actions taken when an aircraft makes an incursion in the safety zone may allow full or partial continuation of the platform's mission. For example, an aircraft in a safety zone may cause separation of some or all components of the payload without releasing the components from the platform as illustrated in FIG. 6B. Alternatively, some of the components (e.g., ballast weight, discharged batteries, etc.) may be released. In various embodiments, additional zones may be included for additional levels of safety. As referred to herein, a situation where an aircraft is in the safety zone may be referred to as a near-collision.

Figure 7:
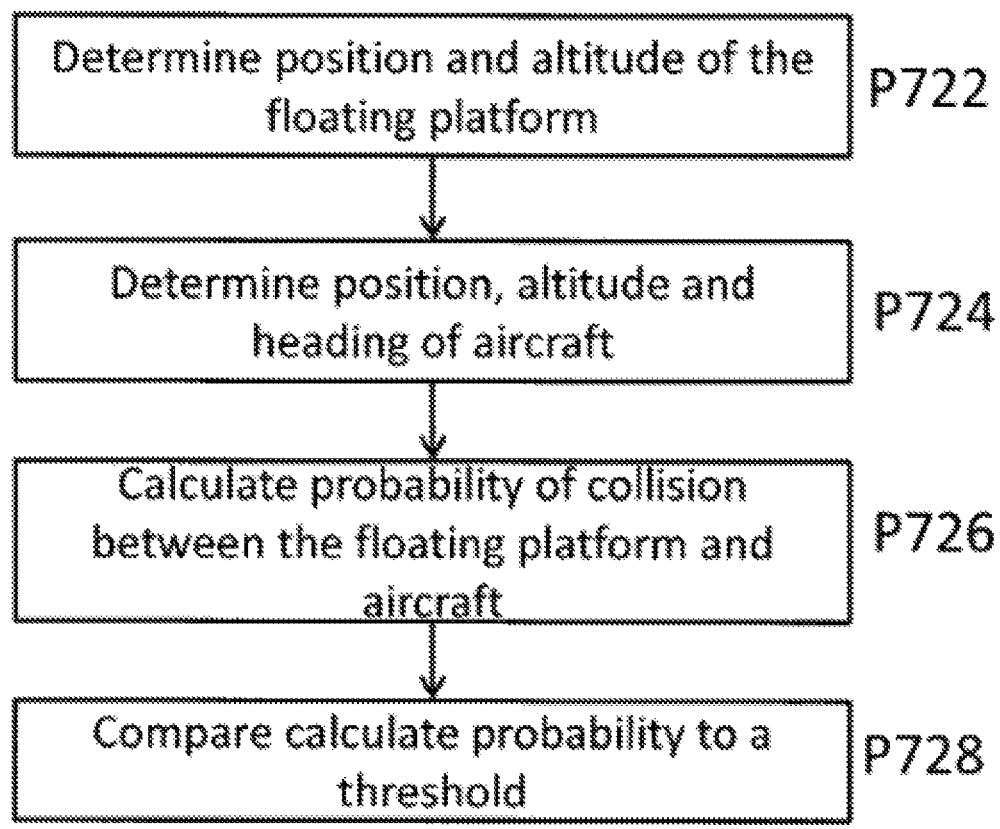
FIG. 7 depicts a flow diagram of a method for determining if a collision between the floating platform and an aircraft is imminent.

FIG. 7 depicts a flow diagram of a method for determining if a collision between the floating platform and an aircraft is imminent. At block P722, the location (position) and altitude of the floating platform is determined. At block P724, the position, altitude and heading of the aircraft are determined. At block P726, a probability of collision between the floating platform and the aircraft is calculated. The calculated probability, in some embodiments, is compared, at block P728, to a threshold to determine if a collision is imminent.

In some embodiments, the transponder decoder and/or other logic circuits are configured to monitor signals for an approaching aircraft, calculate the rate of approach of the aircraft and determine if the altitude of the aircraft will coincide with the floating platform. A probability of an imminent collision or a near collision is calculated using these signals.

In some embodiments, the aircraft position may be determined by one or more sensors on the floating platform. For example, the floating platform may include a passive collision avoidance system (PCAS) that receives data from aircraft transponders. Other examples may include, without limitation, optical detectors or cameras, laser range finders, LIDAR, acoustic sensors, thermal sensors, thermal cameras, RADAR, ADSB-in (automatic dependent surveillance broadcast receiver), and the like or any combination thereof. In some embodiments, the floating platform may receive information about aircrafts from the ground, e.g., via a ground-station or a ground-based controller. The information from the ground may include, for example, RADAR information, TCAS (Traffic Collision Avoidance System), flight control information (such as Flight Aware), flight plans, etc. In some embodiments, the floating platform may receive information about aircrafts from other floating platforms. For example, once one floating platform receives information about an aircraft using any of the aforementioned means, that floating platform may broadcast the information to other floating platforms in the area.

In an embodiment, if the probability of an imminent collision or a near collision exceeds a threshold, the release mechanism is activated such that the various groups of component parts are separated and released from the floating platform. For example, if the total payload weight is about 15 pounds, it can be divided in 3 parts—one with batteries, weighing 6 pounds, one with the altitude control system (e.g., a ballast system), weighing 5 pounds, and one with the antenna, electronics and rest of the payload, weighing 4 pounds. Other distributions are contemplated.

In an embodiment, the released components return to earth on parachutes or a similar recovery system. In another embodiment, some or all of the released components may be equipped with a homing beacon that broadcasts its position, e.g., using GPS coordinates so that the parts can be recovered.

In addition to the logic circuit monitoring the position and heading of the aircraft, in some embodiments, the position and heading of the floating platform may also be determined for improved accuracy. In an embodiment, flight path vector of the floating platform can be obtained using the rate of ascent or descent, float altitude, float location, and wind speeds and directions at the location of the floating platform. Based on wind speeds at various altitudes around that location, and based on the rate of ascent of the floating platform (which is dependent on the type and volume of gas within the enclosure of the floating platform), one can predict the location and altitude of the floating platform at a future time. The location and altitude of the floating platform as a function of time can, then, be expressed as a flight-path vector of the floating platform.

In some embodiments, only information relating to the current position of the aircraft may be available via the transponder decoder and/or other logic circuits. In such embodiments, determining the probability of collision or near-collision may be based on a current location method. Aircraft relative horizontal distance from platform (ARHDP) is determined by subtracting the platform position from the aircraft position. Likewise, aircraft relative altitude from platform (ARADP) is determined by subtracting the platform altitude from aircraft altitude. If the ARHDP and ARADP place the aircraft in the collision zone or the safety zone, the release mechanism may be activated.

In some embodiments, information relating to the aircraft flight vector may be available via the transponder decoder and/or other logic circuits. In such embodiments, several approaches may be used to determine the probability of collision or near-collision. In one method, the relative position of the aircraft relative to the platform is determined based on current positions of the aircraft and the platform. Additionally, relative flight vector of the aircraft relative to the platform is determined, e.g., by subtracting platform vector from aircraft vector. Based on the relative position and the relative flight vector, closest horizontal approach distance (CHAD), altitude difference at this distance (AltD), and time until closest approach (TCA) are determined. In another method, sequential relative distances and relative altitude are used to determine rate of closure between the aircraft and the platform, TCA, CHAD, and AltD. If CHAD and AltD place a probably position of the aircraft in the collision zone or the safety zone, the release mechanism is activated.

As explained elsewhere herein, the actions performed by the release mechanism upon activation may be different based on whether the aircraft is in collision zone or safety zone. For example, components may be released from the platform such that the components descend to earth under gravity if the aircraft is in the collision zone. On the other hand, if the aircraft is in the safety zone, the components may be separated so as to remain attached to the platform by a line to provide distance between components and still allow functionality.

An embodiment disclosed herein relates to a rise rate control system for the floating platform. For example, a typical national weather service (NWS) balloon system, as is well known, may include of a rubber extensible balloon filled with a lifting gas, a parachute tied to the balloon, a line extending down from the parachute and a radiosonde tied to the end of that line. The radiosonde collects and transmits weather related data down to a ground station as the balloon system rises through the atmosphere.

The NWS requires that weather balloons rise at a standard rate of about 1,000 feet per minute. This is nearly impossible to maintain throughout the balloon's rise due to many factors including the variance with altitude of the pressure and temperature of both the lifting gas and the ambient air, the variance in the balloon material, the manufacturing process, and the physical change in the size of the balloon itself as the balloon rises.

In addition, a significant number of NWS weather balloons do not obtain the desired altitude of 100,000 feet because, among other reasons, the balloon expands significantly when obtaining the higher altitudes, becoming thin and many times bursting early for the reasons listed elsewhere herein. If the amount of gas could be reduced at the higher altitudes, the chance of balloon burst would be decreased.

Some embodiments described herein utilize a rise rate control system to vent the lifting gas as needed to slow the balloon's ascent to no more than 1,000 feet per minute. Additionally, by venting the lifting gas, the balloon size is reduced, increasing the probability of reaching the desired 100,000-foot altitude without bursting.

In an embodiment, the rise rate control system may include a venting mechanism attached to the neck of the balloon that can release lifting gas from the balloon, a vent actuator for opening and closing the venting mechanism, an altitude sensor for determining the altitude and rise rate of the balloon system, and a comparing mechanism or circuit to control the vent actuator to cause the vent to release some lifting gas when the desired rise rate is greater than the desired value.

In one embodiment, a GPS unit provides the processor with rise rate information. The processor compares the current rise rate with the desired rise rate stored in the processor's memory. For the NWS balloon systems, the desired rise rate is 1,000 feet per minute. If the current rise rate is higher than the desired rise rate, the processor directs the actuator to open the vent until the desired rise rate is achieved.

Additionally, a ballast system containing a ballast container, ballast, and a ballast actuator could be added to the rise rate control system. The processor compares the current rise rate with a minimum desired rise rate stored in the processor's memory. If the current rise rate is lower than the desired minimum rise rate, the processor, may activate the ballast actuator to drop ballast until the rise rate increases to the desired value.

In an embodiment, a device for ensuring compliance with aviation regulations includes a payload having separable component parts; and a release mechanism configured to separate, upon activation, the component parts and release from the payload such that a weight, density, and/or other physical attributes of each of the component parts is less than a predetermined value, wherein the payload is carried by a floating platform. The predetermined value for the weight and/or density of each component part is chosen to assure compliance with aviation regulations.

In an embodiment, the release mechanism is activated when the floating platform, while descending, is at a given height from the ground so as to prevent damage to ground based persons or property. In some embodiments, the release mechanism is activated automatically after a certain height is reached during descent. In other embodiments, the activation of the release mechanism is dependent on the terrain at the ground location of the floating platform. The terrain information may be stored on board the floating platform, or may be obtained by one or more sensors (e.g., SONAR, LIDAR, etc.) available on the floating platform.

Another embodiment describes a system adapted to ensure compliance with aviation regulations. The system may, in various embodiments, include a payload carried by a floating platform, wherein the payload comprises a separable component parts; a release mechanism configured to separate, upon activation, the component parts and release from the payload such that a weight and/or density of each of the component parts is less than a predetermined value; and a controller configured to determine if a collision or a near-collision between the floating platform and an aircraft is imminent, wherein the controller, upon determination that a collision or a near-collision between the aircraft and the floating platform, activates the release mechanism.

In an embodiment, the controller receives input from a transponder decoder determining the position and heading of an aircraft. Another embodiment includes a positioning system that provides the location information related to the floating platform. In yet another embodiment, the controller is further configured to determine position and heading of the floating platform based on operating parameters of the floating platform such as, for example, the float position, float altitude, and wind velocities at the float position and altitude. In one or more aspects, the system may be configured to determine that an aircraft is within a set distance (e.g. 5 miles), and heading toward the payload (within 10 degrees).

In an embodiment, a probability of an imminent collision or near-collision between an aircraft and the floating platform is calculated. If the probability is greater than a predetermined threshold, the release mechanism is activated such that the payload is separated into component parts and released. The released component parts may descend back to earth using one of various recovery mechanisms, e.g., a parachute.

Figure 8:
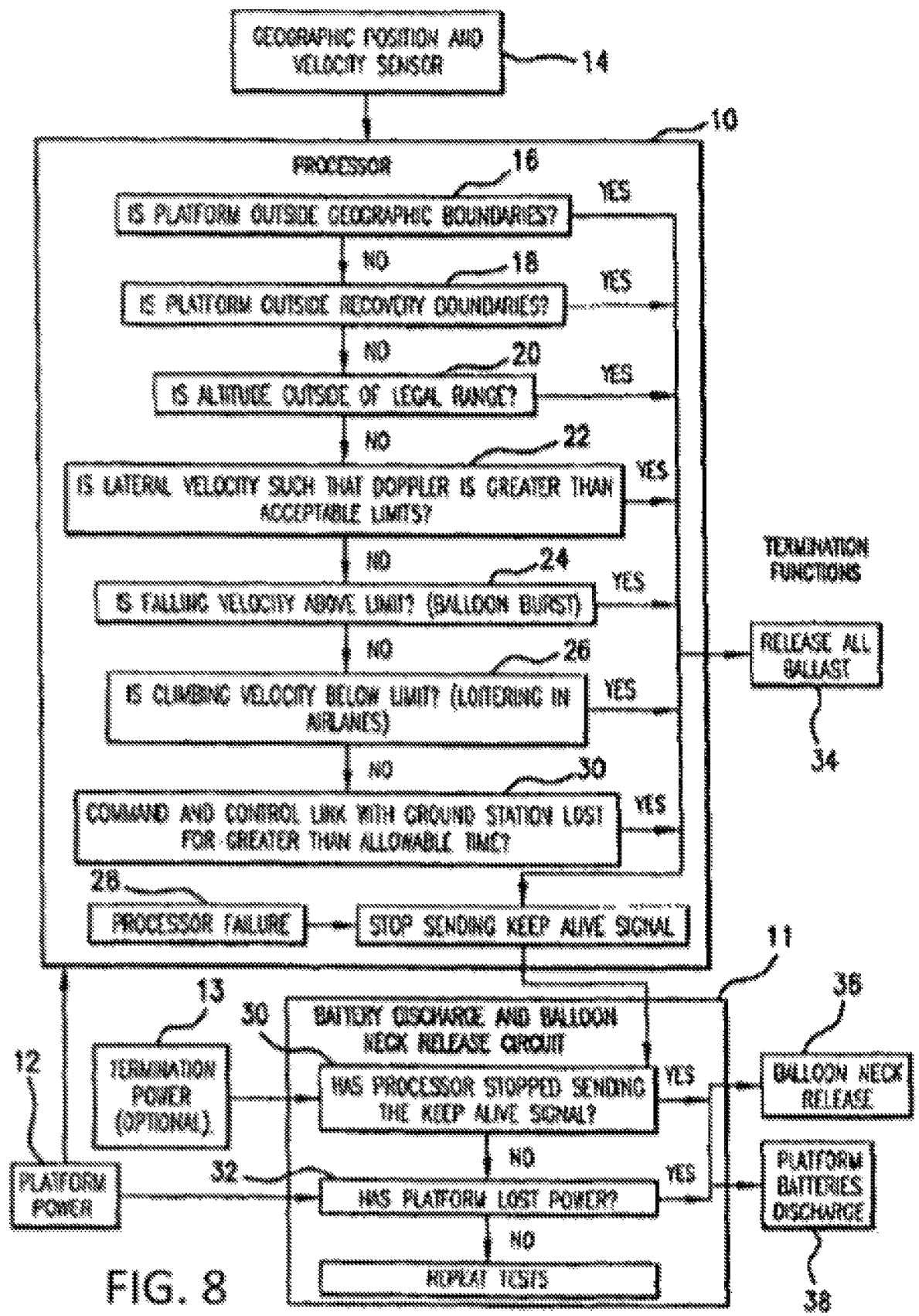
FIG. 8 depicts a method of making floating platform flight termination decisions by a processor according to an embodiment of the present disclosure.

In addition to a situation when there is a threat of collision or near-collision with another aircraft, in some embodiments, the system may determine that it is optimal to terminate the flight of the floating platform or terminate (or pause) transmission from the floating platform completely. FIG. 8 schematically depicts the method of making floating platform flight termination decisions by a processor of the system.

In combination with an onboard power source 12 and GPS 14 (or other geographic locator or tracking system), a processor 10 is provided to receive position information and rate of change of position (velocity) information 14. The position information is compared to stored or programmed criteria information at 16, 18, 20, 22, 24, 26, 28 and 30, to determine whether termination of radio transmission and/or termination of flight should be implemented.

In an embodiment, in the context of the floating platform being in a US governed airspace, the following criteria based decisions are provided with the processor 10:

as the platform moved or drifted outside of a certain geographic area? (See FIG. 8, at 16.)

The relevant boundaries may be frequency license borders set by the FCC as dictated by a regional or nationwide broadcasting license. The FCC prohibits transmitter operation outside such geographic borders. Additionally, a neighboring country may have restrictions on transmitted power into their country from a foreign transmitter. For example, Mexico prohibits transmit power levels above −99 dBm on certain frequencies into Mexico from the United States. These restrictions are not hard for terrestrial towers to comply with as the towers can install and adjust directional antennas once during installation and not have to adjust them again thereafter. This is quite different for a free drifting high altitude ballooncraft containing a transmitter as the position and altitude may be constantly changing and may require the platform to stop transmitting while still inside the United States, but within a protective number of miles of the United States-Mexico border. Additionally, it may be desirable to take action if the floating platform drifts inside of or within a certain distance of a restricted or undesirable area such as an area in which recovery is difficult or an area in which aircraft are prohibited. Thus, it may be desirable to terminate flight and/or transmission if the platform moves into or outside certain geographic areas. Is the platform moving outside of boundaries that would significantly reduce the probability of recovering the platform? (See FIG. 8 at 18.)

As payloads costs may be significant, from $50 to $150 for a typical weather service radiosonde, up to several hundreds of dollars for a transceiver platform, and up to many tens of thousands of dollars for a scientific payload, recovery may be important both financially and for environmental reasons. A platform may encounter strong winds especially in the jet stream as it descends from high altitudes. In order to keep the platform from drifting out of the country on descent, artificial borders that take into account the winds during descent can be used. Also, boundaries of large bodies of water such as the great lakes, seas and oceans the crossing of which might hamper or prevent recovery of the platform upon normal decent, may be taken into account for termination of flight purposes. Has the platform fallen below or risen above a set altitude range? (See FIG. 8 at 20)

Most scientific and weather balloons reach altitudes above 60,000 feet. The FAA regulates airspace below 60,000 feet and discourages free floating craft or uncontrolled flight craft from loitering, especially in commercial air lanes, as they present a hazard to commercial planes. Current NWS weather balloons do not have the capability to terminate the flight if they start to hover below 60,000 feet. Even the large-scale scientific balloons may become errant and free drift below 60,000 feet.

Is the platform velocity sufficient to create an unacceptably large doppler shift in the transmission frequency? (See FIG. 8, at 22)

A ballooncraft traveling in the jet stream may reach speeds of over 180 miles per hour. This creates a Doppler shift in the frequencies received on the ground. The FCC regulates the amount of total frequency drift allowed on transmissions. Doppler shift contributes to this total frequency drift and if great enough can cause the transmitter to transmit out of its allowed band. Therefore, it may be desirable that the payload be able to immediately stop transmitting past the speed at which the Doppler shift becomes too great.

Does the platform fall rate indicate a balloon burst? (See FIG. 8, at 24.)

A fast fall rate indicates that the balloon has burst and that the platform is falling. Transmission from the platform may need to be terminated in such a situation. Alternatively, a homing beacon transmission may be initiated.

Is the platform rising too slowly during ascent? (See FIG. 8, at 26.)

This indicates that the gas enclosure of the floating platform is under-filled or leaking. A slow rise rate may present a danger to aircraft by loitering excessively at one altitude particularly at an altitude in designated air lanes. Flight termination may be optimal in such situations. Has the processor, the position finding equipment, or the primary power failed? (See FIG. 8, at 28.)

A GPS, star tracker, or system power failure should initiate an on-board termination. The platform must be able to terminate without processor control or power to prevent the platform from being lost without a trace and thereby, potentially pose hazard to commercial flights.

Have command and control communications been lost? (See FIG. 8, at 30.)

Without command and control from the ground, the payload should cease transmission and the flight should be terminated.

The systems and devices disclosed herein detect the foregoing conditions by comparing current position, velocity, and operating conditions to stored, programmed or calculated criteria using an onboard processor or controller. The systems and devices utilize a GPS unit and a processor to determine the current platform's geographic coordinates and velocities. A GPS unit or pressure sensor determines the platform altitude. The processor algorithms will implement the complete set of conditions listed above causing the ballast to be released at 34, the transmitter to be shut off at 38 and the flight terminated at 36 upon detection of a stored, programmed or calculated termination criteria. Under conditions of a power loss or processor failure, the transmitter will also be shut off at 38, and the flight will be terminated at 36. The methods and mechanisms for the termination actions are described more fully below.

A separate termination controller 11, which may be under separate power 13 monitors the primary platform power at 32 and monitors processor functions at 30 to determine if the processor 10 is functioning properly. Both the primary processor 10 and the separate termination controller 11 have the ability to terminate transmissions, by discharging the primary platform batteries at 38 and to terminate the flight by releasing the balloon or activating the release mechanism disclosed herein at 36. The separate power source 13 may advantageously comprise a very small environmentally acceptable battery such as an alkaline watch battery.

Figure 9:
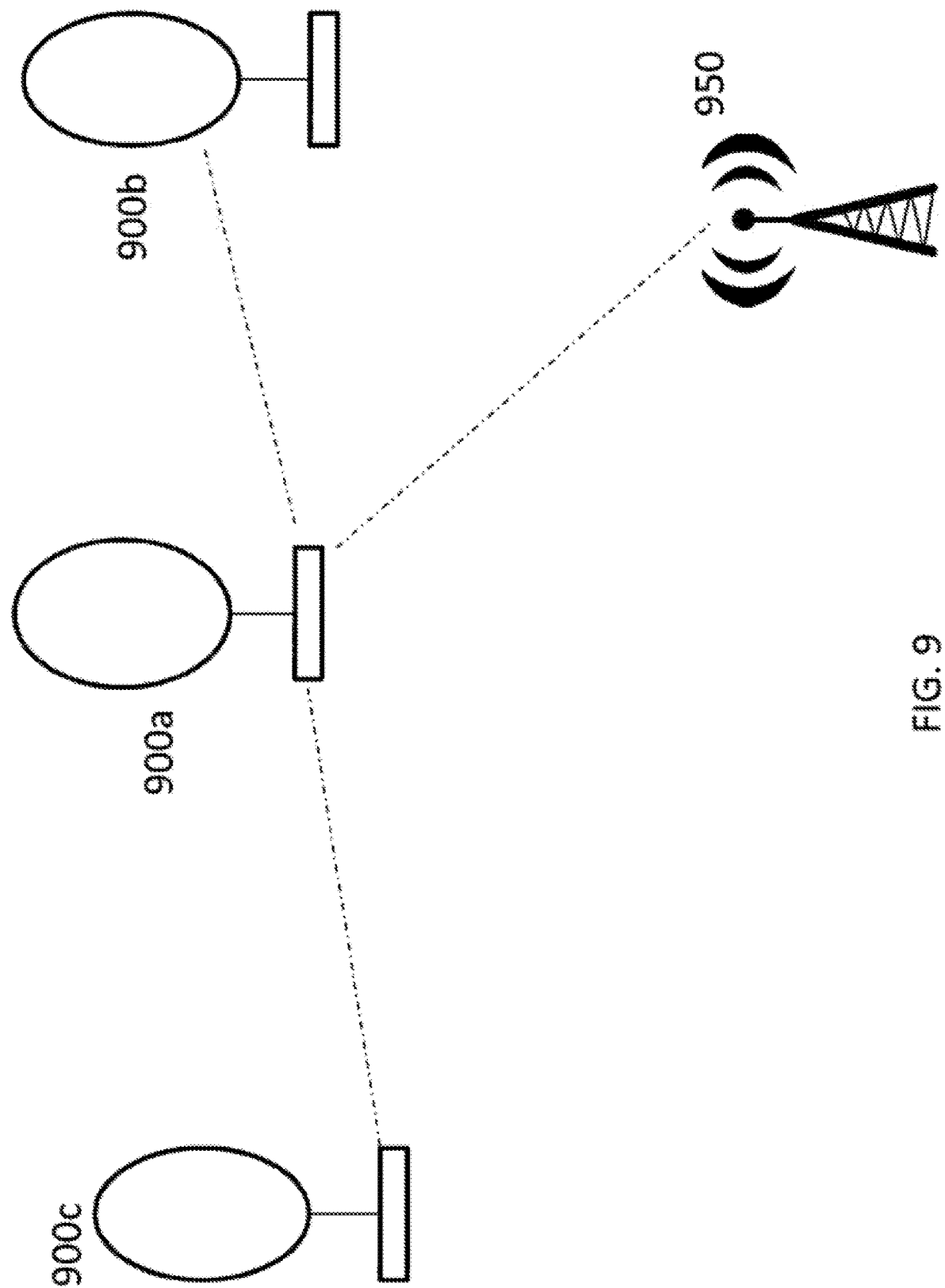
FIG. 9 depicts a schematic of a floating platform in communication with a ground station and/or other floating platforms according to an embodiment of the present disclosure.

FIG. 9 depicts a schematic of a floating platform in communication with a ground station and/or other floating platforms. Floating platform 900a may communicate with ground station 950 and/or other floating platforms 900b, 900c, etc. In some embodiments, release mechanism(s) associated with floating platforms 900a, 900b, 900c etc. may be activated remotely via ground station 950 or any one or more of the other floating platforms. For example, in a use case scenario, there is a failure of the system for detecting aircraft on a particular platform, e.g., 900a. In such a scenario, a ground station 950, or one of the other floating platforms may still be able to detect that an aircraft is within a safety zone or a collision zone associated with platform 900a. Ground station 950, or one of the other floating platforms, e.g., 900b may be able to activate release mechanism(s) associated with platform 900a via a communication link. Communication between platform 900a, and ground station 950 may also include other data transmission.

Another embodiment is implemented as a program product for implementing systems and methods described herein. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples can be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
communicating between a floating platform and a ground station and/or other floating platforms;
determining if an in-flight aircraft is within at least a safety zone associated with the floating platform; and
activating remotely via the ground station or any one or more of the other floating platforms a release mechanism comprising a device, the activating being in response to a determination that the in-flight aircraft is within at least the safety zone;
wherein the floating platform comprises releasably-coupled component parts and the device is configured to uncouple the component parts upon the activating remotely in response to the determining that the in-flight aircraft is within at least the safety zone to the floating platform; and wherein at least one of the component parts has a weight or density less than a certain value.

2. The method of claim 1, further comprising:
obtaining a current position information of the floating platform;
obtaining a current position of the aircraft;
determining a horizontal distance and a vertical distance between the floating platform and the aircraft;
and activating the release mechanism based on whether the horizontal distance or the vertical distance is less than a certain threshold value.

3. The method of claim 1, further comprising determining a probability of collision between the aircraft and the floating platform, wherein said determining the probability of collision comprises:
obtaining a current position and a flight vector of the floating platform;

obtaining a position of the aircraft to a current position of the floating platform, and a flight path vector of the aircraft to the flight vector of the floating platform; and determining the probability of a collision between the aircraft and the floating platform based on the position of the aircraft and the flight-path vector of the aircraft.

4. The method of claim 1, further comprising:

determining a closest horizontal approach distance between the floating platform and the aircraft based on a current position of the floating platform, a flight vector of the floating platform, and a position of the aircraft;

determining a time until closest approach based on the flight-path vector of the aircraft;

determining altitude difference between the floating platform and the aircraft based on the position and the flight-path vector; and activating the release mechanism if the closest horizontal approach distance between the floating platform and the aircraft, the time until closest approach, and the altitude difference are each within a certain respective range of values.

5. The method of claim 1, wherein said determining if the in-flight aircraft is within at least the safety zone comprises processing a probability of a collision between the floating platform and the in-flight aircraft based on a certain threshold value.

6. The method of claim 5, wherein the certain threshold value is based on a minimum in-flight separation between the floating platform and the aircraft mandated by a regulatory agency.

7. A computer-readable medium comprising computer-readable code physically embodied thereon which, when executed by one or more processors undertakes operations comprising:

determining by one or more processors, if an in-flight aircraft is within at least a safety zone associated with a floating platform; and activating by the one or more processors, responsive to a determination that the in-flight aircraft is within at least the safety zone, a release mechanism comprising a device;

wherein the floating platform comprises releasably-coupled component parts, the device is configured to uncouple the component parts upon activation in response to an occurrence of a pre-determined event, and the predetermined event comprises a determination that the in-flight aircraft is within at least the safety zone relative to the floating platform.

8. The computer readable medium of claim 7, wherein the operations further comprise:

obtaining a current position information of the floating platform;

obtaining a current position of the aircraft;

determining a horizontal distance and a vertical distance between the floating platform and the aircraft; and activating the release mechanism based on whether the horizontal distance or the vertical distance is less than a certain threshold value.

9. The computer readable medium of claim 7, wherein the operations further comprise:

determining a probability of collision between the aircraft and the floating platform, wherein said determining the probability of collision comprises:

obtaining a current position and a flight vector of the floating platform;

obtaining a position of the aircraft to a current position of the floating platform, and a flight-path vector of the aircraft to the flight vector of the floating platform; and determining the probability of a collision between the aircraft and the floating platform based on the position of the aircraft and the flight-path vector of the aircraft.

10. The computer readable medium of claim 7, wherein the operations further comprise:

determining a closest horizontal approach distance between the floating platform and the aircraft based on a current position of the floating platform, a flight vector of the floating platform, and a position of the aircraft;

determining a time until closest approach based on the flight-path vector of the aircraft;

determining altitude difference between the floating platform and the aircraft based on the position and the flight-path vector; and activating the release mechanism if the closest horizontal approach distance between the floating platform and the aircraft, the time until closest approach, and the altitude difference are each within a certain respective range of values.

11. A system comprising a floating platform, a ground station and/or other floating platforms;

wherein the floating platform comprises:

a component comprising releasably-coupled component parts; and a release mechanism comprising a device configured to uncouple the component parts upon activation in response to a determination that an aircraft is within at least a safety zone to the floating platform;

wherein at least one of the component parts has a weight or density less than a certain value permissible under an aviation guideline; and wherein the system is configured for remote activation via the ground station or any one or more of the other floating platforms.

12. The floating platform of claim 11, wherein the pre-determined event further comprises one or more of (i) a command received from a ground station in communication with the floating platform, (ii) a mission termination command, and (iii) a determination that the floating platform has entered a prohibited or restricted airspace.

13. The floating platform of claim 11, wherein the payload floating platform comprises a power supply, a battery, a ballast system, an antenna system, an electronic system, a housing, or any combination thereof.

14. The system of claim 11, wherein the release mechanism is configured to uncouple at least one of the component parts after uncoupling at least one of the other component parts.

15. The system of claim 11, wherein the release mechanism is configured to uncouple a second of the component parts after a certain time period following an uncoupling of a first of the component parts.

16. The system of claim 11, wherein the device comprises a controller.

17. The system of claim 11, wherein the floating platform comprises a balloon.

18. The system of claim 11, wherein the device comprises at least one of a connector, a solenoid, a motorized drum, a spring-loaded blade, a thermal cutter, an electrically releasable glue, a magnetically releasable fastener, and a chemically releasable fastener; the connector comprising at least one of an electrical connector, a magnetic connector, an electromagnetic connector, a pneumatic connector or a hydraulic connector, wherein the connector of the release mechanism is configured to uncouple upon activation of the release mechanism.

19. The system of claim 11, wherein at least one of the component parts is coupled to a recovery system.

20. The system of claim 11, wherein the component parts are coupled using spring loaded connectors or a cord configured to be severed upon activation of the release mechanism.

* * * * *